(12) United States Patent
Hanawa

(10) Patent No.: US 8,542,401 B2
(45) Date of Patent: Sep. 24, 2013

(54) IMAGE PROCESSING APPARATUS AND METHOD FOR CONTROLLING THE SAME

(75) Inventor: Keiko Hanawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 12/537,173

(22) Filed: Aug. 6, 2009

(65) Prior Publication Data

US 2010/0033742 A1 Feb. 11, 2010

(30) Foreign Application Priority Data

Aug. 8, 2008 (JP) ................................. 2008-206200

(51) Int. Cl.
*H04N 1/60* (2006.01)

(52) U.S. Cl.
USPC .............................. 358/1.9; 358/474; 382/164

(58) Field of Classification Search
USPC .................. 358/1.9, 1.18, 540; 382/284, 309
See application file for complete search history.

(56) References Cited

U.S. PATENT DOCUMENTS

| | | | | | |
|---|---|---|---|---|---|
| 5,448,379 | A | * | 9/1995 | Ishihara et al. | 358/518 |
| 5,809,366 | A | * | 9/1998 | Yamakawa et al. | 399/39 |
| 6,023,534 | A | * | 2/2000 | Handley | 382/275 |
| 7,054,509 | B2 | * | 5/2006 | Rom | 382/306 |
| 7,522,320 | B1 | * | 4/2009 | Kimura | 358/474 |
| 7,554,695 | B2 | * | 6/2009 | Sekizawa et al. | 358/2.1 |
| 7,639,392 | B2 | * | 12/2009 | Li et al. | 358/1.9 |
| 7,791,764 | B2 | * | 9/2010 | Kubota | 358/2.1 |
| 7,940,434 | B2 | * | 5/2011 | Inoue | 358/518 |
| 7,986,832 | B2 | * | 7/2011 | Maeda et al. | 382/164 |
| 8,184,902 | B2 | * | 5/2012 | Maeda et al. | 382/164 |
| 8,194,277 | B2 | * | 6/2012 | Maeda et al. | 358/1.18 |
| 8,451,520 | B2 | * | 5/2013 | Komatsu et al. | 358/518 |
| 2005/0212174 | A1 | * | 9/2005 | Tanahashi et al. | 264/286 |
| 2005/0213174 | A1 | | 9/2005 | Maki et al. | |
| 2007/0035755 | A1 | * | 2/2007 | Maki et al. | 358/1.9 |
| 2007/0041027 | A1 | * | 2/2007 | Malik et al. | 358/1.9 |
| 2009/0303544 | A1 | * | 12/2009 | Kido | 358/1.18 |
| 2010/0033741 | A1 | * | 2/2010 | Kido et al. | 358/1.9 |

FOREIGN PATENT DOCUMENTS

| | | |
|---|---|---|
| JP | 10-042153 A | 2/1998 |
| JP | 10-042154 A | 2/1998 |
| JP | 2002-287573 A | 10/2002 |
| JP | 2003-080789 A | 3/2003 |
| JP | 2006-094466 A | 4/2006 |
| JP | 2007-243529 A | 9/2007 |
| JP | 2008-028962 A | 2/2008 |

* cited by examiner

*Primary Examiner* — Steven Kau
*Assistant Examiner* — Ashish K Thomas
(74) *Attorney, Agent, or Firm* — Canon U.S.A., Inc. IP Division

(57) ABSTRACT

An image processing apparatus includes a printing unit to print an image on a sheet, a reading unit to read the sheet, a conversion unit to convert a background image stored in a storage medium into a reference image that represents the background image and has a luminance value higher than that of the background image, a print control unit to cause the printing unit to print the reference image obtained by the conversion unit, as an entry area for a user, on the sheet, an extraction unit to extract an image of an area that has a luminance value lower than a first threshold and a color-difference value greater than a second threshold from an image corresponding to the entry area included in the image read by the reading unit after an entry by the user in the entry area, and a combining unit to combine the image extracted by the extraction unit with the background image.

19 Claims, 34 Drawing Sheets

*100* MFP

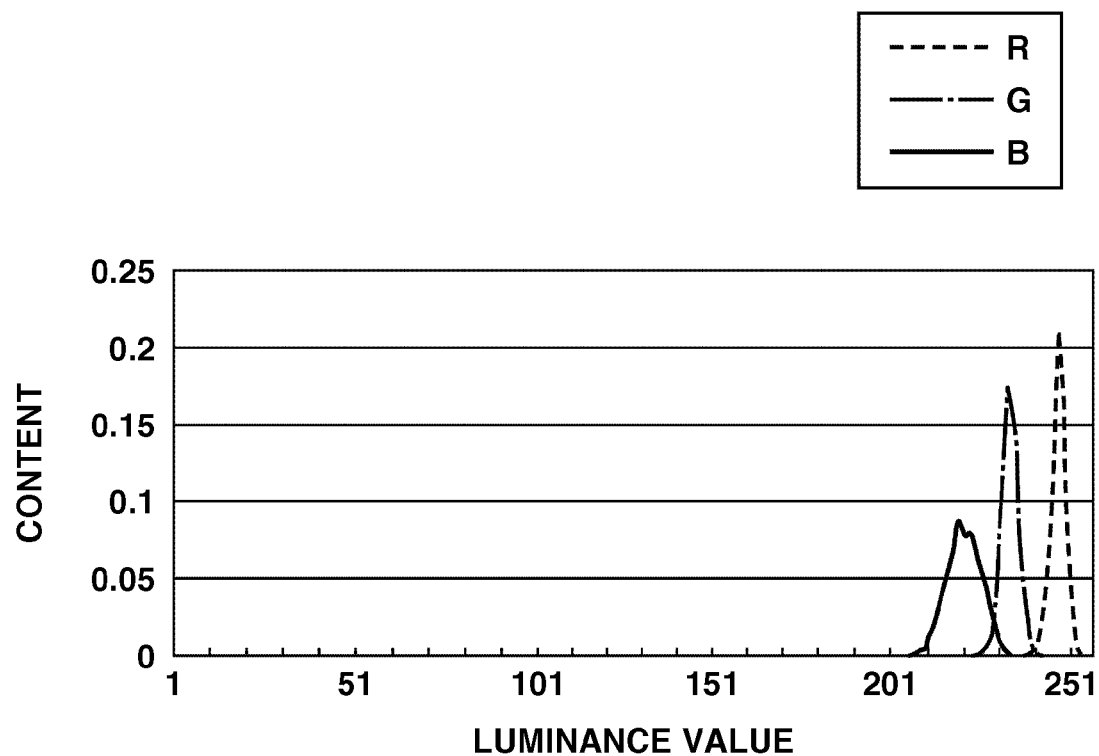

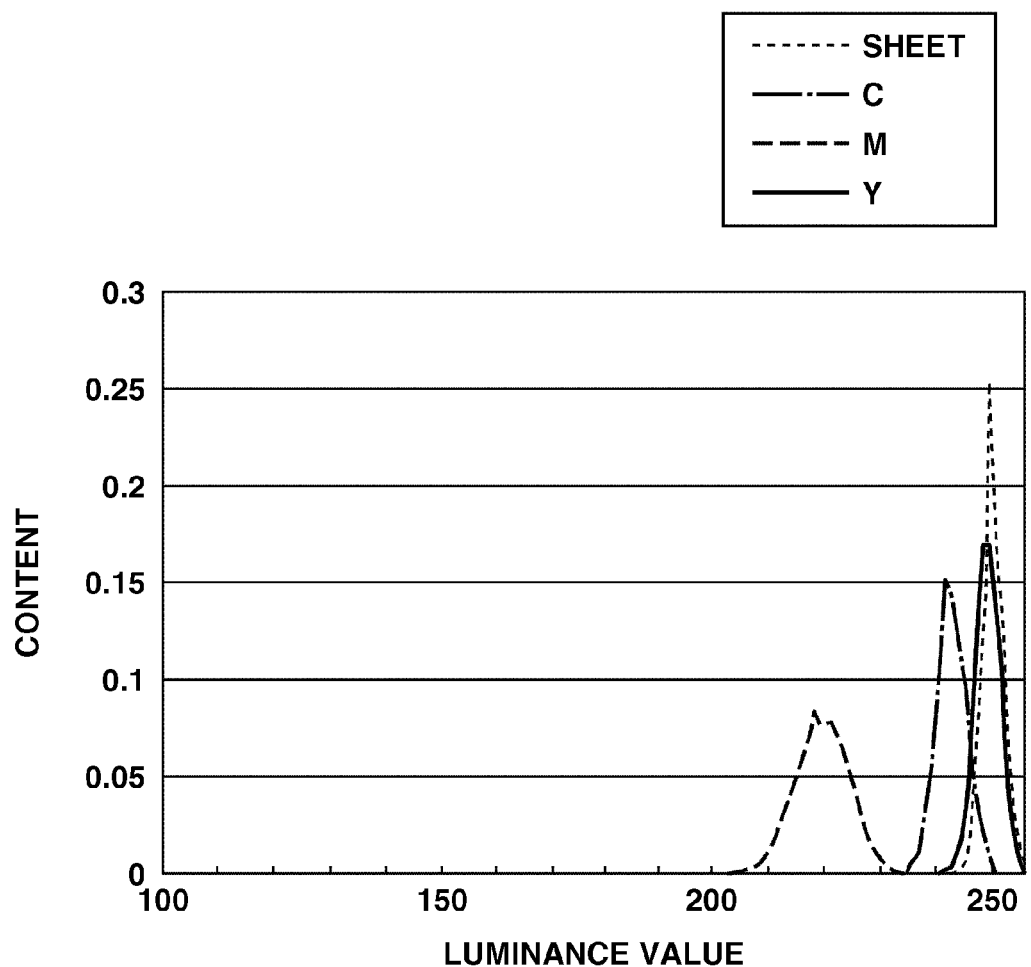

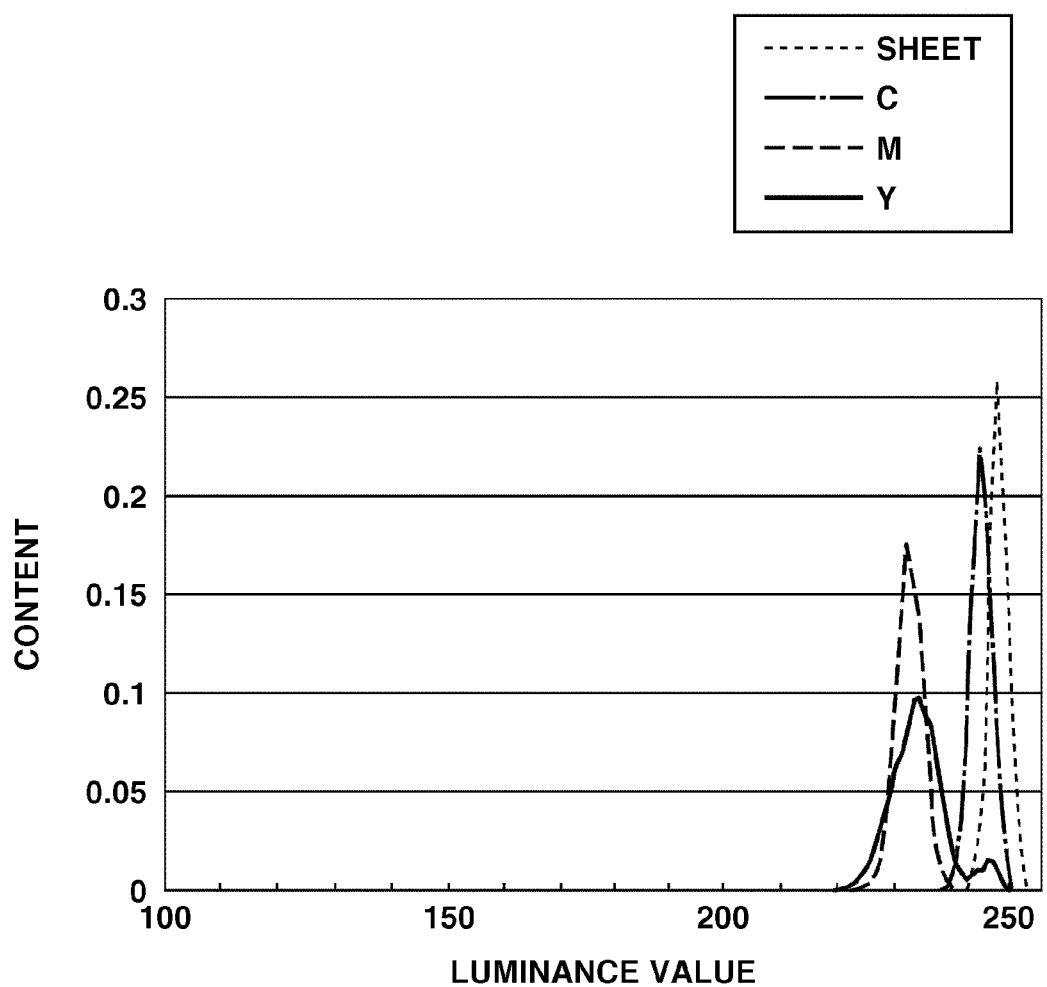

FIG.19

|  |  | SHEET 1 | | SHEET 2 | |
|---|---|---|---|---|---|
|  |  | DISPERSION | AVERAGE | DISPERSION | AVERAGE |
| SHEET ONLY | R | 1.504401 | 249.6804 | 4.383832 | 227.8827 |
|  | G | 1.991849 | 249.4638 | 5.526591 | 223.5365 |
|  | B | 1.667852 | 247.8513 | 4.756863 | 216.6989 |
| CYAN PALE PRINTED | R | 3.277442 | 232.2506 | 5.027294 | 220.2629 |
|  | G | 2.735057 | 242.1127 | 5.808816 | 219.806 |
|  | B | 1.870573 | 244.6983 | 5.229849 | 215.067 |
| MAGENTA PALE PRINTED | R | 2.202079 | 245.3436 | 4.11566 | 225.6741 |
|  | G | 4.814769 | 219.1141 | 6.327864 | 200.1813 |
|  | B | 2.448422 | 232.1404 | 5.03941 | 203.4489 |
| YELLOW PALE PRINTED | R | 1.667926 | 248.6482 | 4.562804 | 228.0069 |
|  | G | 2.357298 | 248.6981 | 5.700181 | 223.0134 |
|  | B | 4.963441 | 233.8634 | 6.16304 | 208.3416 |

IMAGE PROCESSING APPARATUS AND METHOD FOR CONTROLLING THE SAME

BACKGROUND OF THE INVENTION

1. Field of the Invention

The present invention relates to an image forming apparatus including a scanner and a printer, which can combine a digital image with an image indicating a content handwritten by a user.

2. Description of the Related Art

A recent multifunction peripheral (MFP) which includes a printer capable of printing an image on a sheet and a scanner capable of reading the sheet could perform various operations. For example, as discussed in Japanese Patent Application No. 2003-80789, the multifunction peripheral can combine a digital image stored in a storage medium with a scanned image read by a scanner from a handwritten sheet (hereinafter, referred to as a "handwritten image") and print the combined image.

More specifically, the multifunction peripheral causes the printer to print a sheet on which a user can add information by handwriting (hereinafter, referred to as a "handwritten document sheet") and causes the scanner to read the sheet after the user completes an entry by handwriting. Then, the apparatus extracts the handwritten image from the scanned image and combines the extracted handwritten image with the digital image. The user is allowed to add a handwritten image in a specific area (hereinafter, referred to as a "handwriting area") on the handwritten document sheet. Further, the digital image in the storage medium (i.e., the image designated as an object to be combined with the handwritten image in the handwriting area of the handwritten document sheet) is referred to as a "combination target image" or a "background image."

Further, the multifunction peripheral has a function of printing a pale image of the combination target image (hereinafter, referred to as a "pale printed image" or a "reference image") in the handwriting area to guide the user to add the handwritten image to a desired position on the combination target image when they are combined.

However, to realize the above-described guiding function, the multifunction peripheral is required to discriminate a pale printed image from a handwritten image to accurately extract the handwritten image from the handwriting area. Meanwhile, it is desired that the users are allowed to use various colors for the entry by handwriting. However, if the color of a handwritten content has a higher luminance value, it is difficult to discriminate the pale printed image from the handwritten image.

In this respect, Japanese Patent Application No. 2007-243529 discusses an image forming method that prints a color patch on a handwritten document sheet that indicates a color used for a pale printed image. More specifically, the method analyzes image data obtained from a handwriting area of the sheet and compares the used color with the color patch to discriminate the pale printed image from the handwritten image.

However, according to this method, it is necessary to prepare the patch for discriminating the pale printed image beforehand somewhere on the handwritten document sheet. In other words, providing a patch at a specific position on the handwritten document sheet restricts the design of the handwritten document sheet.

SUMMARY OF THE INVENTION

The present invention is directed to an image forming apparatus that can accurately discriminate a pale printed image from a handwritten image without providing any patch.

According to an aspect of the present invention, an image processing apparatus includes a printing unit configured to print an image on a sheet, a reading unit configured to read the sheet, a conversion unit configured to convert a background image stored in a storage medium into a reference image that represents the background image and has a luminance value higher than that of the background image, a print control unit configured to cause the printing unit to print the reference image obtained by the conversion unit, as an entry area for a user, on the sheet, an extraction unit configured to extract an image of an area that has a luminance value lower than a first threshold or a color-difference value greater than a second threshold from an image corresponding to the entry area included in the image read by the reading unit after an entry by the user in the entry area, and a combining unit configured to combine the image extracted by the extraction unit with the background image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 15D is a histogram illustrating RGB luminance values that can be obtained by scanning a sheet on which a pale printed image is formed with only a yellow ink.

FIG. 16B is a histogram illustrating green (i.e., G) luminance values of a cyan pale printed image, a magenta pale printed image, and a yellow pale printed image that are printed on a sheet.

FIG. 16C is a histogram illustrating blue (i.e., B) luminance values of a cyan pale printed image, a magenta pale printed image, and a yellow pale printed image that are printed on a sheet.

FIG. 19 illustrates average values and dispersions of RGB luminance values that can be obtained when pale printed images are printed on each sheet.

DETAILED DESCRIPTION OF THE EMBODIMENTS

Figure 1:
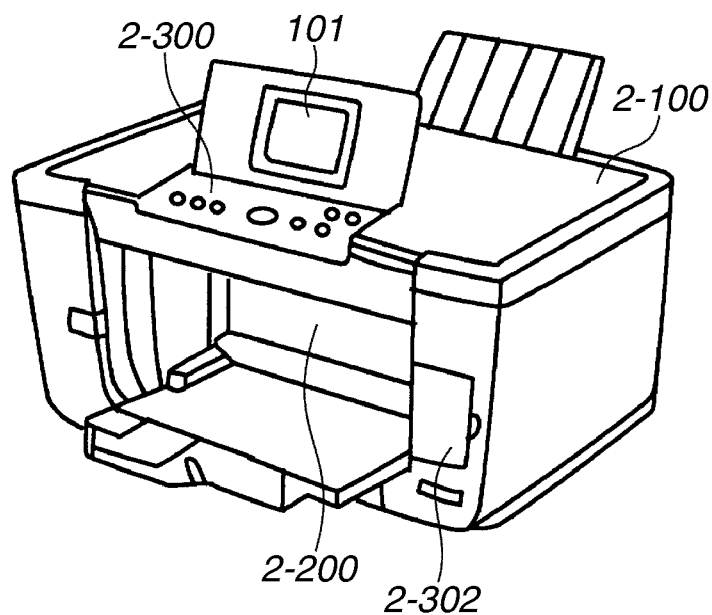
FIG. 1 is a perspective view of a multifunction peripheral (i.e., MFP) according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 illustrates a perspective view of an MFP 100 according to a first exemplary embodiment of the present invention. The MFP 100 is an example of an image forming system and includes a display unit 101, an operation unit 2-300, a storage medium control unit 2-302, a scanner unit 2-100, and a printer unit 2-200.

Figure 2:
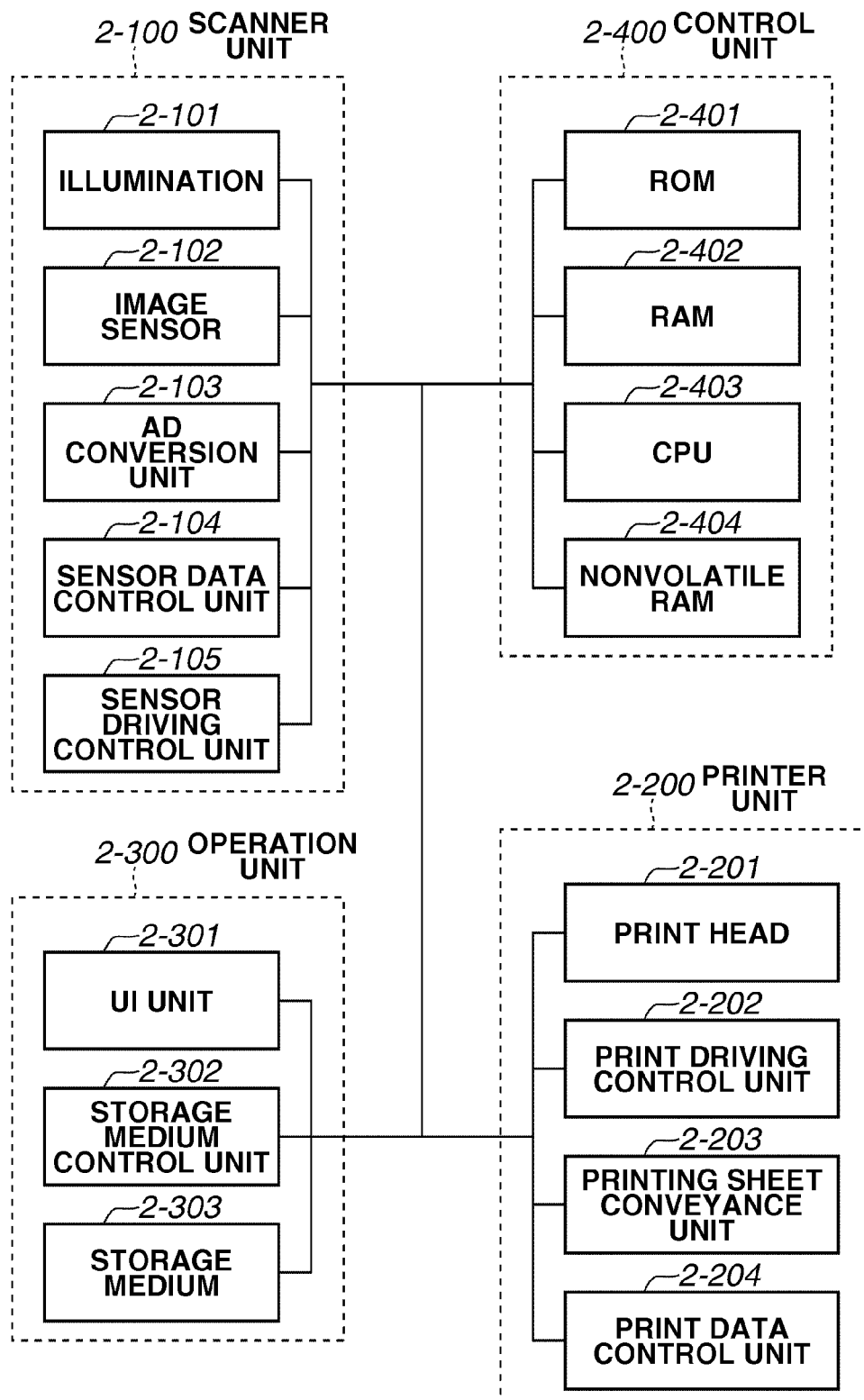
FIG. 2 is a block diagram illustrating the MFP.

FIG. 2 is a block diagram illustrating the MFP 100.

The scanner unit 2-100 is, for example, a contact image sensor (CIS) or charge coupled device (CCD) color scanner which can form digital data of an image while causing a plurality of sensors disposed on a line to move in a predetermined direction. An illumination 2-101 illuminates a document with light. An image sensor 2-102 can receive reflection light from the illuminated document. An analog-digital (i.e., AD) conversion unit 2-103 can convert an amount of the received light into digital data. A sensor data control unit 2-104 can store the obtained data in a random access memory (RAM) 2-402. A sensor driving control unit 2-105 can control movement of the image sensor 2-102 and the illumination 2-101.

The printer unit 2-200 is, for example, an inkjet printer. The inkjet printer can form an image on a printing sheet with color inks that are supplied from ink cartridges (not illustrated). A print data control unit 2-204 can store print data of an image to be printed. For example, when a user requests a copy job via a user interface (UI) unit 2-301, the scanner unit 2-100 performs reading processing. The print data of image data is transmitted via a control unit 2-400 and stored in the print data control unit 2-204. If a user instructs the control unit 2-400 to print an image stored in a storage medium 2-303 via the UI unit 2-301, the control unit 2-400 reads the image from the storage medium 2-303. The read image is converted into print data and stored in the print data control unit 2-204.

If a personal computer or an external storage apparatus (not illustrated) requests a print job, image data is input from the external storage apparatus via an interface unit. The print data control unit 2-204 temporarily stores print data generated from the image data.

A print driving control unit 2-202 can determine an ink discharge position according to the print data stored in the print data control unit 2-204. A printing sheet conveyance unit 2-203 can convey a printing sheet referring to the determined position. A print head 2-201 can discharge ink droplets to form an image on the printing sheet.

The operation unit 2-300 enables users to input operational commands to the MFP 100 illustrated in FIG. 2. The UI unit 2-301 is an operation unit, for example, an operation panel that includes keys and a liquid crystal screen. The storage medium control unit 2-302 includes an attachment unit via which users can attach the storage medium 2-303, such as a secure digital (i.e., SD) card, to the MFP 100. If the attached storage medium 2-303 includes image data, the storage medium control unit 2-302 recognizes the data and notifies the control unit 2-400 of the presence of the image data.

The control unit 2-400 can control various operations to be performed by the MFP 100. A read only memory (i.e., ROM) 2-401 is a nonvolatile memory that can store control programs for the MFP 100. A central processing unit (i.e., CPU) 2-403 can function as a scanner control unit and a printer control unit when the CPU 2-403 executes the control programs. In the first exemplary embodiment, the CPU 2-403 can further function as a handwritten document sheet printing unit, a handwritten document sheet scanning unit, a combination execution unit, and a combination result printing unit.

The scanner control unit controls the scanner unit 2-100 to generate digital data of a document. The printer control unit controls the printer unit 2-200 to form an image on a sheet based on the digital data. When a user operates the operation unit 2-300 to request generating a handwritten document sheet, the handwritten document sheet printing unit generates digital data of the requested handwritten document sheet based on a combination target image and causes the printer unit 2-200 to output the image. If the scanner unit 2-100 scans a handwritten document sheet, the handwritten document sheet scanning unit acquires digital image data and extracts a handwritten image. The combination execution unit combines the extracted handwritten image with a combination target image (serving as a background image) and transmits the combination result to the printer unit 2-200.

The RAM 2-402 successively stores temporarily required data, such as image data read by the scanner unit 2-100 and print data converted into a Joint Photographic Experts Group (JPEG) format file for the printer unit 2-200. The temporary data in the RAM 2-402 is immediately deleted if they become unnecessary.

Figure 3:
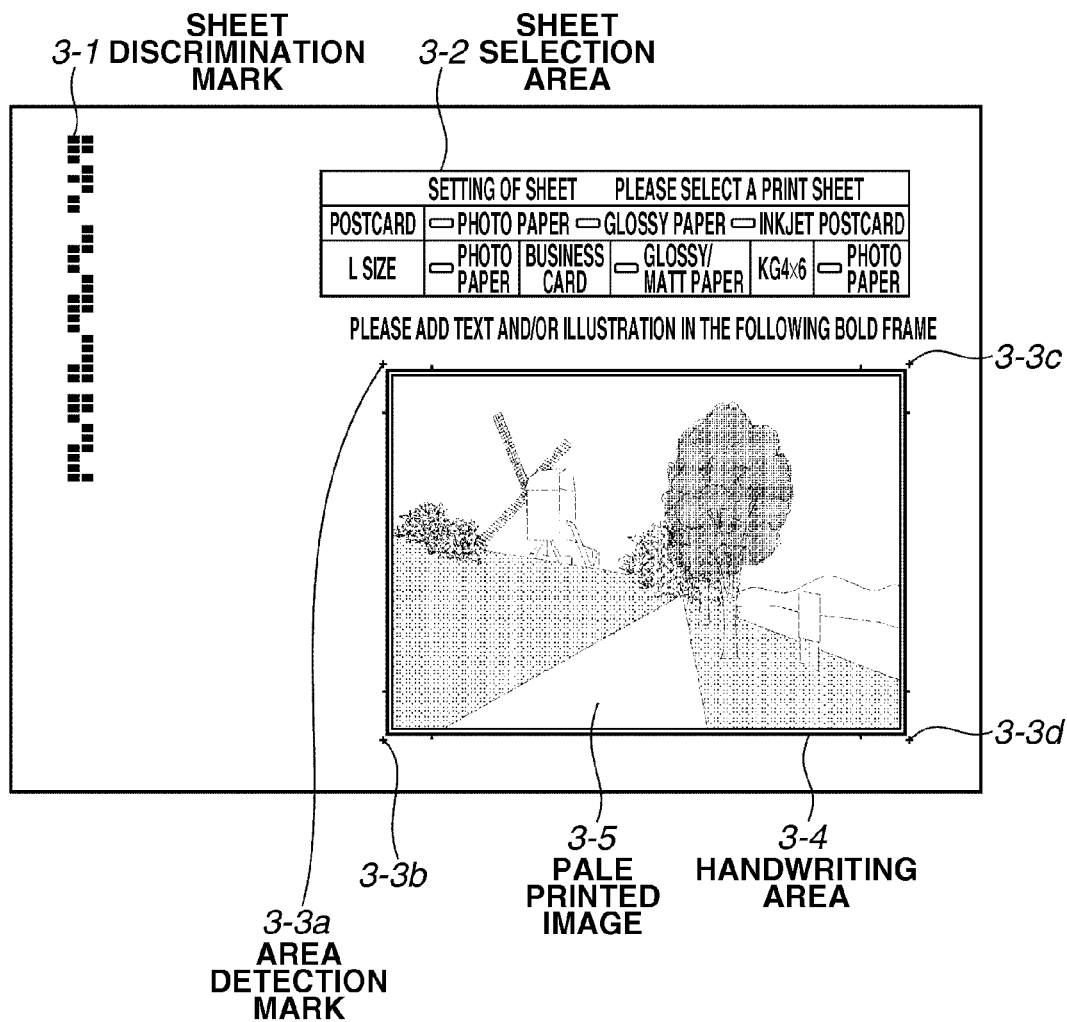
FIG. 3 illustrates an example of a handwritten document sheet.

FIG. 3 illustrates an example of a handwritten document sheet SH1. A sheet discrimination mark 3-1 can be used, when the handwritten document sheet SH1 is scanned, to determine whether the scanned document is the "handwritten document sheet SH1." The sheet discrimination mark 3-1 includes information identifying an image to be combined among the images stored in a storage medium. Therefore, a shape of the sheet discrimination mark 3-1 is variable depending on the handwritten document sheet SH1.

A sheet selection area 3-2 is provided for a list of sheet sizes, from which users can select a desired sheet size for printing the combination result of the combination target image and the handwritten image. Four area detection marks 3-3a to 3-3d can be used to accurately extract a handwritten portion when the handwritten document sheet SH1 is scanned. In the first exemplary embodiment, the area detection marks 3-3a to 3-3d can be used to detect an inclination when the handwritten document sheet SH1 is inclined relative to a document positioning plate. Further, an inclination correction parameter is obtainable from the area detection marks 3-3a to 3-3d.

Users can add a handwritten image into a handwriting area 3-4. The image printed in the handwriting area 3-4 is a pale printed image 3-5. The pale printed image 3-5 can be generated by printing a pale combination target image. The pale printed image 3-5 enables users to easily understand position relationship between the handwritten image and the combination target image as a result of a combination of the handwritten image and the combination target image.

Figure 4:
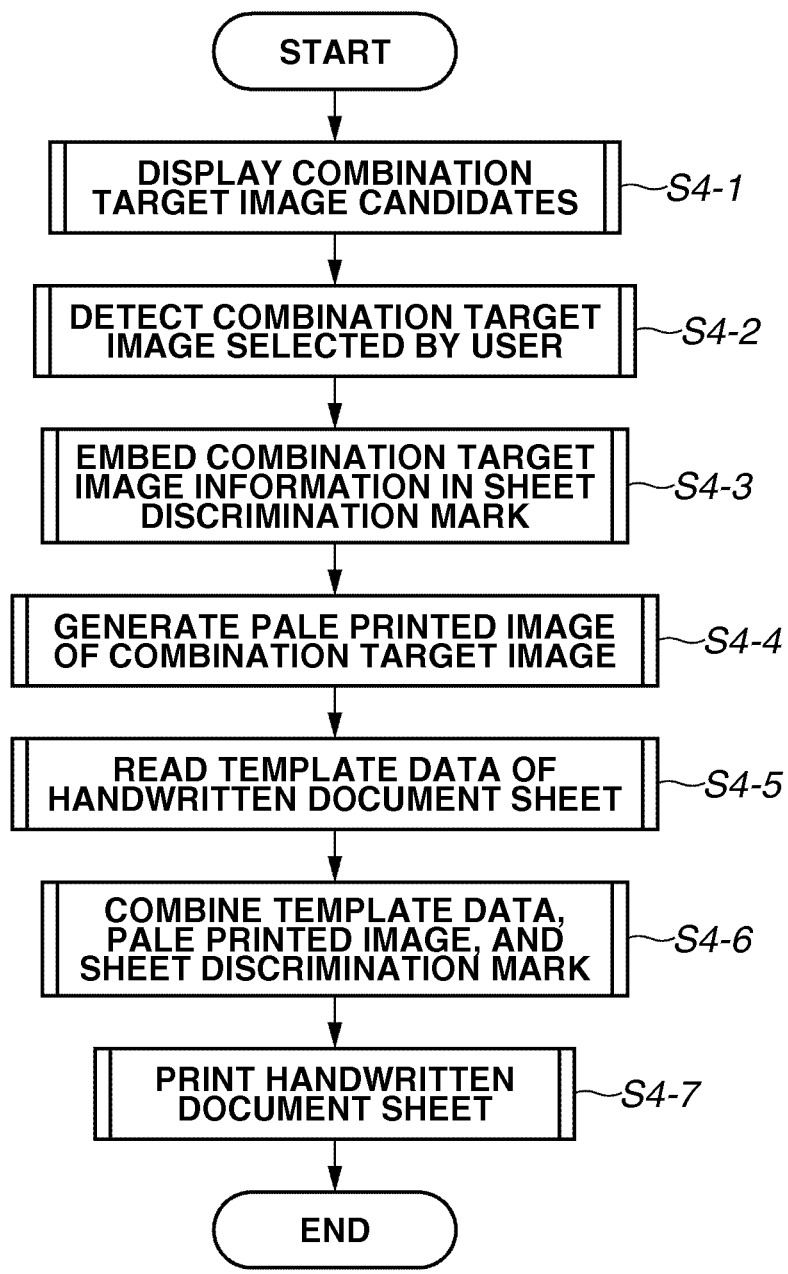
FIG. 4 is a flowchart illustrating an example operation for printing a handwritten document sheet according to the first exemplary embodiment.

FIG. 4 is a flowchart illustrating an example operation for printing the handwritten document sheet SH1 according to the first exemplary embodiment. In the present exemplary embodiment, the "image data" is digital data including R, G, and B luminance values of each pixel in an image. The "binary image data" is image data using 1 or 0 to express each pixel value.

In step S4-1, a user operates the UI unit 2-301 to select execution of handwriting navigation sheet printing. In this case, the CPU 2-403 functions as the handwritten document sheet printing unit and generates thumbnail images of combination target images loaded from the storage medium 2-303 to the RAM 2-402 and causes the UI unit 2-301 to display the generated thumbnail images.

In step S4-2, the user operates the UI unit 2-301 to select a combination target image to be combined while viewing the displayed thumbnail images.

Figure 11A:
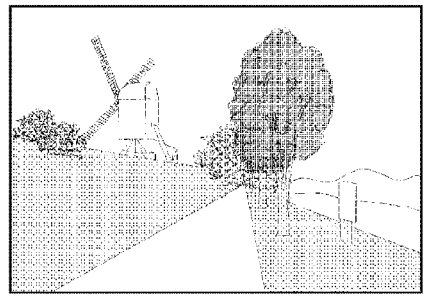
FIG. 11A illustrates an example of a combination target image.

FIG. 11A illustrates an example of the combination target image according to the first exemplary embodiment. In step S4-3, the CPU 2-403 reads combination target image data from the storage medium 2-303 via the storage medium control unit 2-302 and temporarily stores the combination target image data in the RAM 2-402. At this time, the CPU 2-403 generates the sheet discrimination mark 3-1 in which information identifying the combination target image in the storage medium 2-303 is embedded.

When an aspect ratio of a format for the pale printed image is different from an aspect ratio of the combination target image, the CPU 2-403 trims the combination target image so as to coincide with the format of the pale printed image. In this case, information indicating a portion of the combination target image that is trimmed to generate the pale printed image is embedded in the sheet discrimination mark 3-1.

In step S4-4, the CPU 2-403 generates a pale printed image to be printed in the handwriting area 3-4 of the handwritten document sheet SH1 by converting the combination target image illustrated in FIG. 11A. First, if the combination target image is different from the handwriting area 3-4 in the aspect ratio, the CPU 2-403 adjusts the aspect ratio of the combination target image by trimming so that the pale printed image does not include any meaningless clearances or blank spaces. The CPU 2-403 can embed, in the sheet discrimination mark 3-1, information indicating trimming performed on the combination target image. Then, the CPU 2-403 resizes the data size writable in the handwriting area 3-4.

Figure 5:
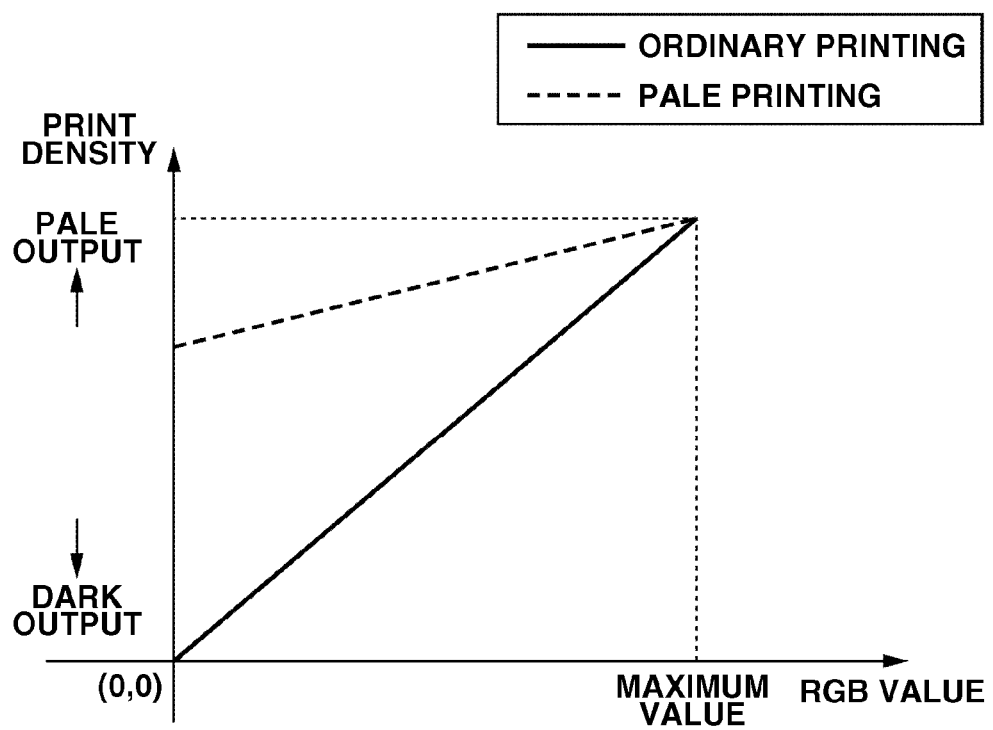
FIG. 5 is a graph illustrating an input/output relationship in a case where a pale printed image to be printed on a handwritten document sheet is generated.

FIG. 5 is a graph illustrating an input/output relationship in a case where a pale printed image to be printed on the handwritten document sheet SH1 is generated. As illustrated in FIG. 5, the CPU 2-403 can convert the combination target image into an image represented in a low-density region by decreasing a gradation number of the combination target image. According to an example method for decreasing the gradation number of the combination target image, the gradation numbers of the RGB luminance values are simultaneously decreased to generate pale printed image data of a color image. According to another example method, the gradation number of the combination target image is decreased via conversion into the gray scale to generate pale printed image data of a monochrome image. The image data generated via the above-described processing is referred to as pale printed image data.

The CPU 2-403 stores, in the RAM 2-402, both the pale printed image data generated as described above and the sheet discrimination mark 3-1 generated according to the above-described method.

In step S4-5, the CPU 2-403 reads template data of a digital image of the handwritten document sheet SH1 from the ROM 2-401 and stores the read template data in the RAM 2-402.

In step S4-6, the CPU 2-403 adds the pale printed image data illustrated in FIG. 11A as a reference image in the handwriting area 3-4 of the handwritten document sheet SH1. Similarly, the CPU 2-403 adds the sheet discrimination mark 3-1 to a predetermined position of the handwritten document sheet SH1, to generate image data required to print the handwritten document sheet SH1.

Figure 11B:
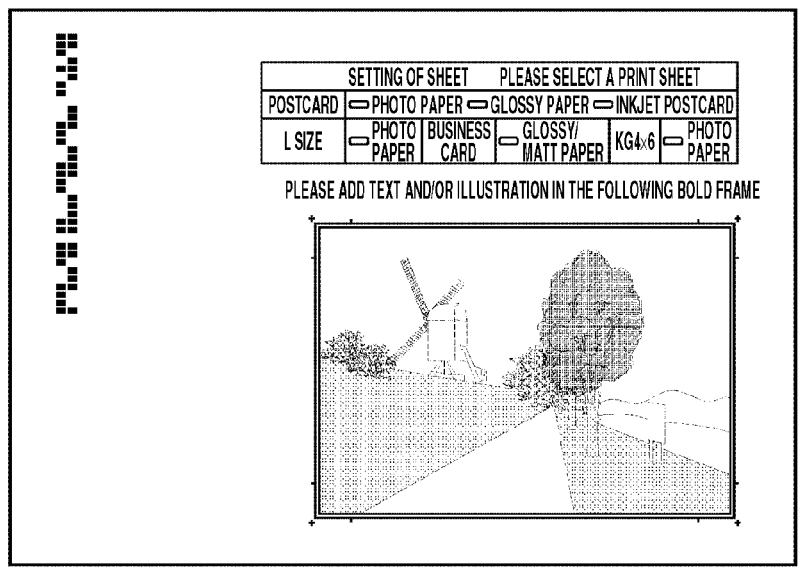
FIG. 11B illustrates an example of a handwritten document sheet including the image illustrated in FIG. 11A.

In step S4-7, the CPU 2-403 outputs the image data generated in step S4-6 to the printer unit 2-200. For example, FIG. 11B illustrates an example of the handwritten document sheet SH1 that includes the combination target image illustrated in FIG. 11A.

After the above-described printing operation of the handwritten document sheet SH1 is completed, the user performs the entry into the handwritten document sheet SH1. First, the user selects a desired size for printing a combination result from the list of sheet sizes in the sheet selection area 3-2, and checks a corresponding mark on the list. Next, the user draws a handwritten image in the handwriting area 3-4 of the handwritten document sheet SH1, as an image to be combined with the combination target image.

Figure 11C:
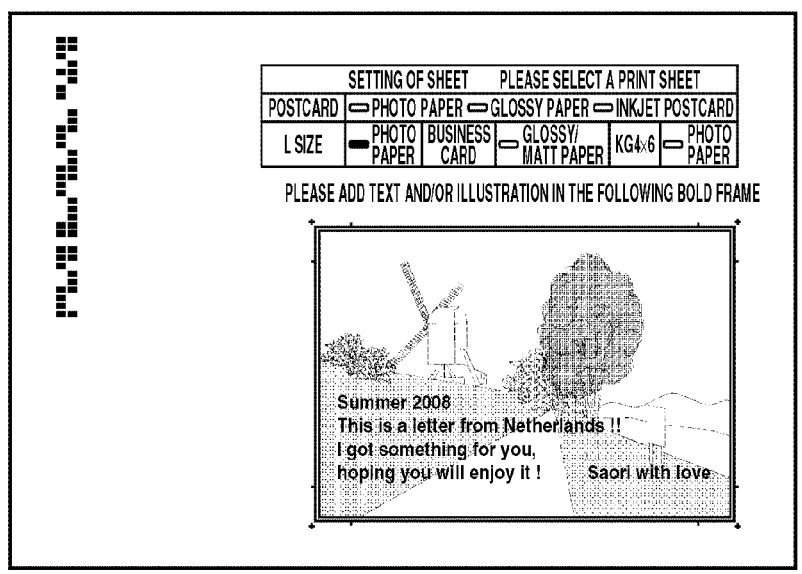
FIG. 11C illustrates an example of the handwritten document sheet, an entry to which has been completed by a user.

FIG. 11C illustrates an example of the handwritten document sheet SH1 in a state where an entry (e.g., writing a text and/or drawing an illustration) by the user is completed. After completing the entry operation, the user causes the MFP 100 to scan the handwritten document sheet SH1. The processing for combining the handwritten image with the combination target image starts when the user causes the MFP 100 to scan the handwritten document sheet SH1.

Figure 6:
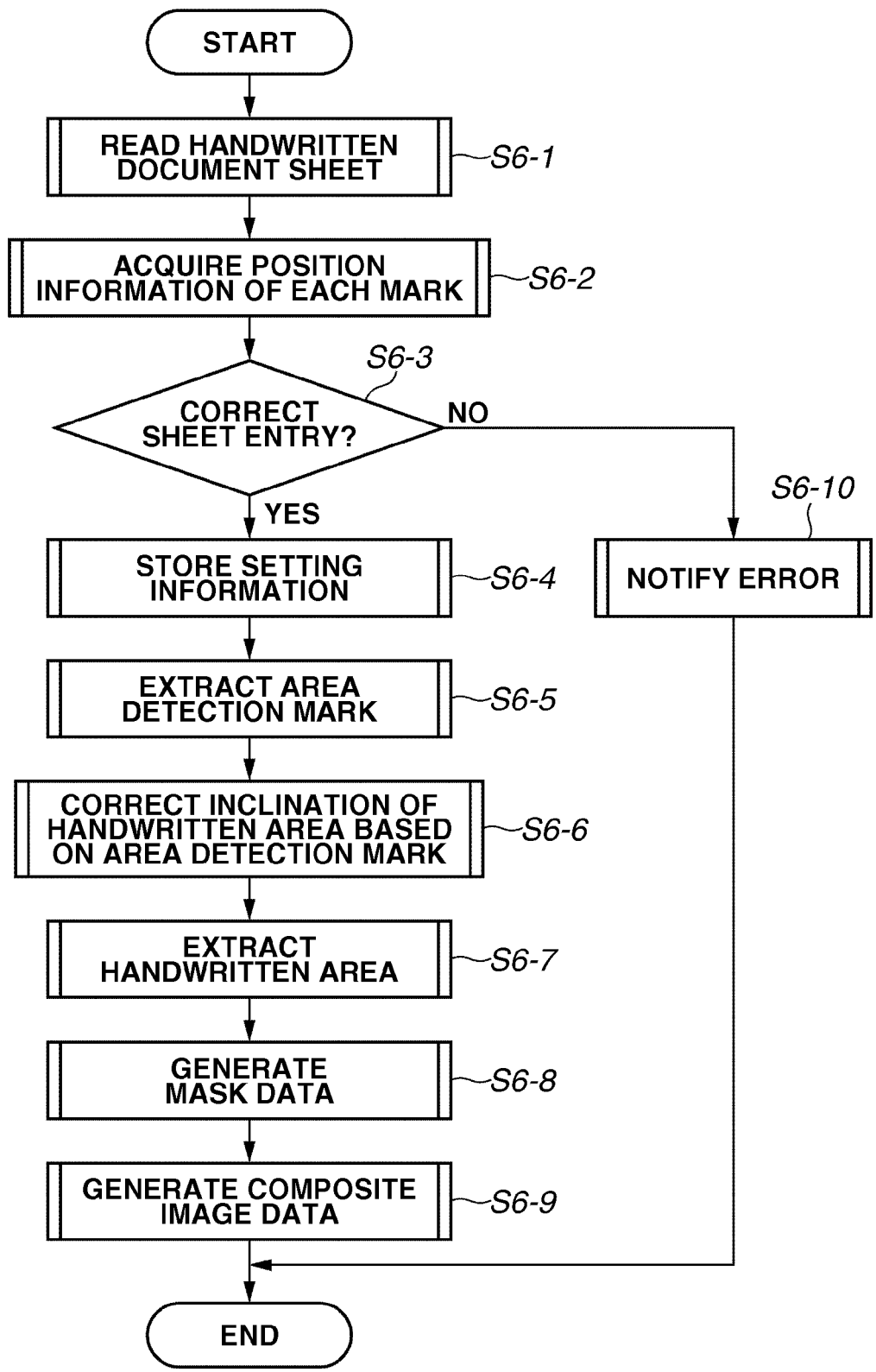
FIG. 6 is a flowchart illustrating an example operation for scanning a handwritten document sheet according to the first exemplary embodiment.

FIG. 6 is a flowchart illustrating an example operation for scanning the handwritten document sheet SH1 according to the first exemplary embodiment. In this case, the CPU 2-403 can function as a scanning unit capable of scanning the handwritten document sheet SH1.

In step S6-1, the CPU 2-403 causes the UI unit 2-301 to display the status that the handwritten document sheet SH1 is ready for reading. The user may operate the UI unit 2-301 to perform the above-described display processing. The user confirms the content displayed on the UI unit 2-301, and causes the scanner unit 2-100 to read the handwritten document sheet SH1 including a handwritten part added by the user. The CPU 2-403 stores image data resultant from the reading processing in the RAM 2-402.

In step S6-2, the CPU 2-403 obtains information indicating positions of the sheet discrimination mark 3-1, the sheet selection area 3-2, and the area detection marks 3-3a to 3-3d from the RAM 2-402.

In step S6-3, the CPU 2-403 analyzes each mark or area. First, the CPU 2-403 analyzes the sheet discrimination mark 3-1. If the analysis result reveals that the read sheet is a drawing combination print instruction sheet (NO in step S6-3), then in step S6-10, the CPU 2-403 performs error notification for the user and terminates the processing of the routine illustrated in FIG. 6.

The sheet discrimination mark 3-1 includes information indicating an image file stored in the storage medium 2-303 that serves as the combination target image. The CPU 2-403 detects the information and accesses the storage medium 2-303 via the storage medium control unit 2-302 to determine whether the combination target image is present in the storage medium 2-303. If the confirmation result reveals that the combination target image is absent (NO in step S6-3), then in step S6-10, the CPU 2-403 performs error notification for the user and terminates the processing of the routine illustrated in FIG. 6.

Next, the CPU 2-403 analyzes the sheet selection area 3-2. In the first exemplary embodiment, the sheet selection area 3-2 has a mark sensing sheet format. Therefore, the CPU 2-403 can identify a mark area checked by the user by counting a number of pixels that are located on predetermined coordinates corresponding to the mark area and have the density exceeding a predetermined level. If it is determined that the sheet entry method is wrong, then in step S6-10, the CPU 2-403 performs error notification for the user and terminates the processing of the routine illustrated in FIG. 6. If it is determined that the entry method is correct (YES in step S6-3), the processing proceeds to step S6-4.

In step S6-4, the CPU 2-403 stores information indicating image data stored in the storage medium 2-303 which serves as a target image to be printed in the RAM 2-402 based on the information included in the sheet discrimination mark 3-1. If trimming is performed due to difference in the aspect ratio when the combination sheet is printed, the discrimination mark includes the information indicating the trimming having been performed. Therefore, the CPU 2-403 analyzes and stores the information. Further, the CPU 2-403 detects information indicating the sheet size selected from the sheet selection area 3-2 by the user, and temporarily stores the detection result in the RAM 2-402.

In step S6-5, the CPU 2-403 identifies the accurate positions of the area detection marks 3-3a to 3-3d using pattern matching or another method. The CPU 2-403 calculates the position of the area detection mark as a result of the processing in step S6-5. If it is determined that the handwritten document sheet SH1 is inclined relative to the document positioning plate of the scanner, the processing proceeds to step S6-6.

In step S6-6, the CPU 2-403 rotates the area including the area detection marks to eliminate the inclination, for example, using affine conversion technology.

In step S6-7, the CPU 2-403 extracts image data from the handwriting area 3-4, i.e., the area defined by the area detection marks. The CPU 2-403 calculates the coordinates indicating the position of the handwriting area 3-4 based on the relative position between the area detection marks 3-3a to 3-3d and the handwriting area 3-4.

In step S6-8, the CPU 2-403 generates binary image data of pixels that represent the handwritten image in the handwriting area 3-4. In the following description, the binary image data indicating the handwritten image is referred to as mask data. More specifically, the mask data is binary image data indicating the handwritten image in the handwriting area 3-4. The configuration of the mask data is similar to that of the image data in the handwriting area 3-4, with respect to a number of pixels arrayed in a vertical and a horizontal directions. According to the mask data, a pixel corresponding to an area identified as not belonging to the pale printed image among the image data in the handwriting area 3-4 is allocated to a value 1. On the other hand, a pixel corresponding to an area identified as belonging to the pale printed image is allocated to a value 0.

Figure 7:
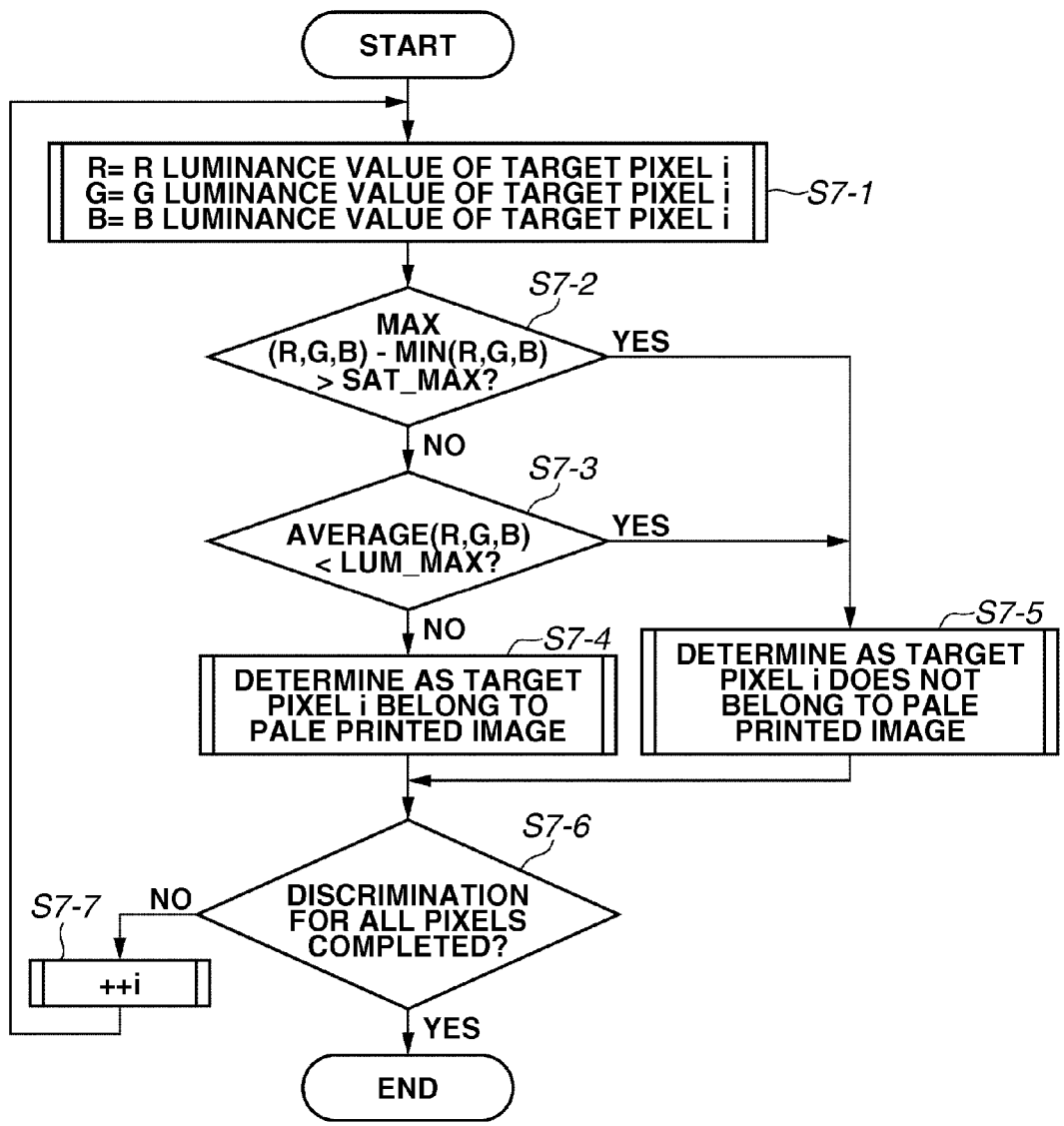
FIG. 7 is a flowchart illustrating an example operation for discriminating a pale printed image from other images.

FIG. 7 is a flowchart illustrating an example operation for discriminating the pale printed image from other images. In step S7-1, the CPU 2-403 extracts RGB luminance values of a target pixel from the image data in the handwriting area 3-4.

In step S7-2, the CPU 2-403 determines whether the color-difference is equal to or greater than a constant value. In the present exemplary embodiment, the color-difference is a value obtained by subtracting the minimum value from maximum value with respect to the RGB luminance values of the target pixel. In general, the color-difference indicates the difference between two colors.

Figure 8:
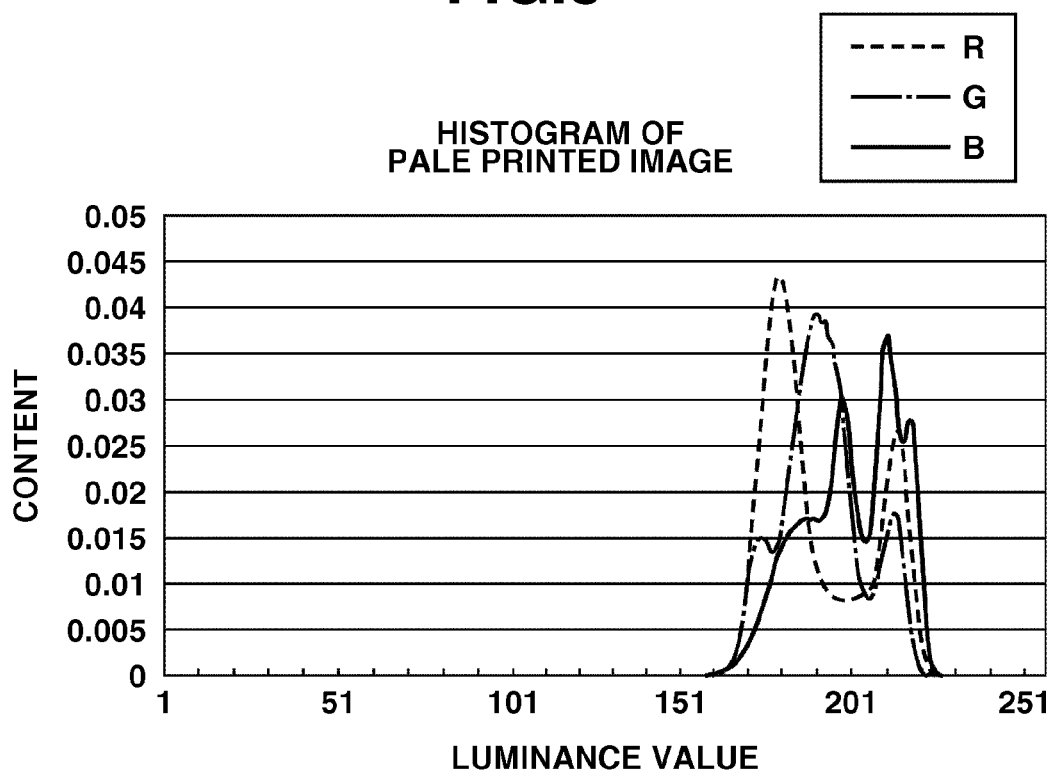
FIG. 8 is a histogram illustrating red-green-blue (i.e., RGB) luminance values of a pale printed image.

The processing in step S7-2 is described below in more detail. FIG. 8 is a histogram illustrating RGB luminance values of a pale printed image. As understood from density characteristics of the pale printed image illustrated in FIG. 5, the density of the pale printed image does not fall below a predetermined value. When the pale printed image is read by the scanner and is converted into image data expressed by the RGB luminance values, the luminance value of the pixel serving as part of the pale printed image is not smaller than the predetermined value, as understood from the histogram of a scanned image of the pale printed image illustrated in FIG. 8.

Further, as apparent from FIG. 8, it can be said that the color-difference of the pixel serving as part of the pale printed image does not exceed a predetermined value. Considering the foregoing, in step S7-2, the CPU 2-403 discriminates the handwritten image from the pale printed image. More specifically, the CPU 2-403 determines whether the color-difference of the target pixel exceeds a maximum value of the color-difference of the pale printed image (hereinafter, referred to as SAT_MAX) stored beforehand in the ROM 2-401. If the color-difference of the target pixel is greater than the above-described value SAT_MAX (YES in step S7-2), the CPU 2-403 determines that the target pixel belongs to an image different from the pale printed image.

Figure 9:
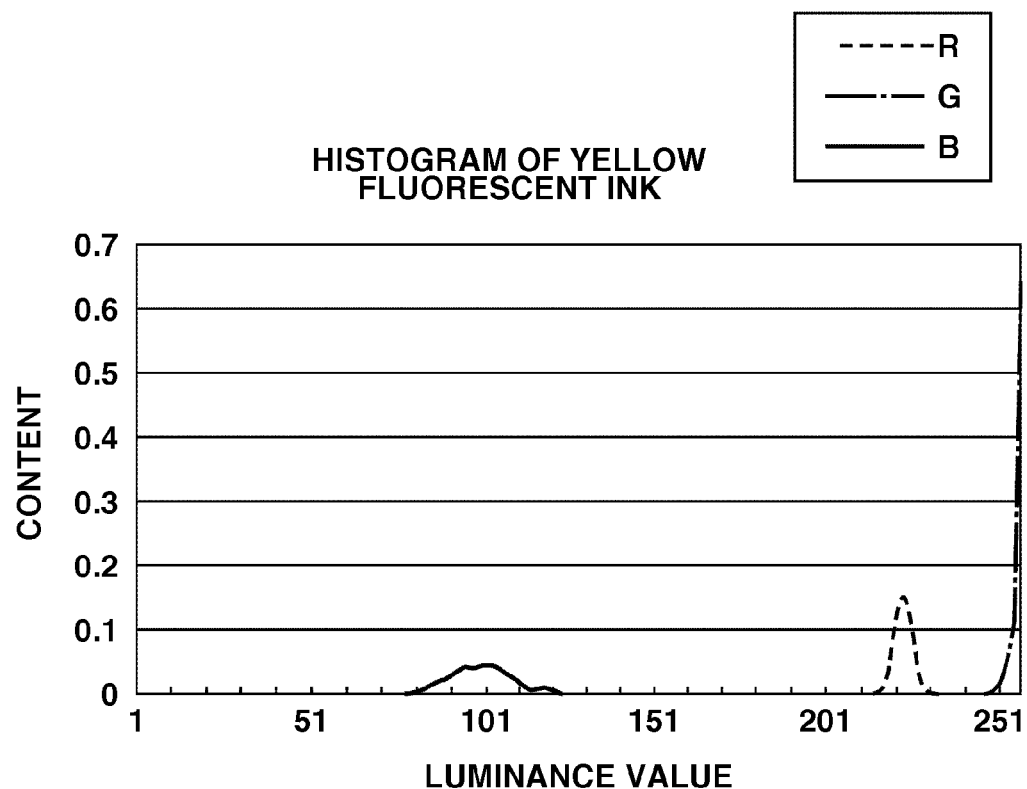
FIG. 9 is a histogram illustrating luminance values of an image of a document written with a yellow fluorescent pen.

FIG. 9 is a histogram illustrating luminance values of an image of a document written with a yellow fluorescent pen. The histogram illustrated in FIG. 9 can be obtained by scanning a white paper on which a line or the like is written with a yellow fluorescent pen and analyzing a scanned image. As illustrated in FIG. 9, the yellow fluorescent color includes a G component whose luminance value is very high. Therefore, an average of RGB luminance values may be greater than that of the pale printed image illustrated in FIG. 8. On the other hand, the color-difference of the yellow fluorescent color is very large. Therefore, possibility that the color-difference of the pixel exceeds SAT_MAX is high. In general, an average of RGB luminance values of the fluorescent color is high and the color-difference of the fluorescent color is large. Accordingly, the CPU 2-403 can identify an area of the fluorescent color in the image by determining whether the color-difference is equal to or greater than SAT_MAX. In other words, the CPU 2-403 can determine that the handwritten image of a document written with a fluorescent pen is an image different from the pale printed image.

FIG. 9 illustrates a scanning result of the white paper with entry (e.g., text or illustration) written with a fluorescent pen. However, if the yellow fluorescent pen is used for the entry to the pale printed image, the RGB luminance values shift toward the lower side on the histogram by an amount corresponding to the luminance values of the pale printed image printed as the background. In this case, if the color-difference value is maintained at the same level even after the shift of the RGB luminance values, the CPU 2-403 can determine that the target pixel does not belong to the pale printed image by the processing in step S7-2. If the average of RGB luminance values becomes smaller compared to that of the pale printed image as a result of the shift, the CPU 2-403 can determine that the target pixel does not belong to the pale printed image by the processing in step S7-3. In the first exemplary embodiment, the ROM 2-401 stores an appropriate value as SAT_MAX that is obtained beforehand through considerations.

If the color-difference of the target pixel is greater than the predetermined (YES in step S7-2), then in step S7-5, the CPU 2-403 determines that the target pixel does not belong to the pale printed image. Then, the processing proceeds to step S7-6. In step S7-6, the CPU 2-403 determines whether the processing in steps S7-2 and S-3 have been completed for all pixels. On the other hand, if the color-difference is equal to or less than SAT_MAX (NO in step S7-2), the processing proceeds to step S7-3. In step S7-3, the CPU 2-403 determines whether an average of RGB luminance values is less than a predetermined value.

The processing in step S7-3 is described below in more detail. When a pale printed image is scanned, the average of luminance values of a pixel in the pale printed image is not smaller than a predetermined value (hereinafter, referred to as LUM_MIN), as understood from the characteristics of the pale printed image illustrated in FIG. 5. Accordingly, if the average of luminance values of the pixel is less than the predetermined value LUM_MIN, the CPU 2-403 can determine that the target pixel does not belong to the pale printed image.

Figure 10:
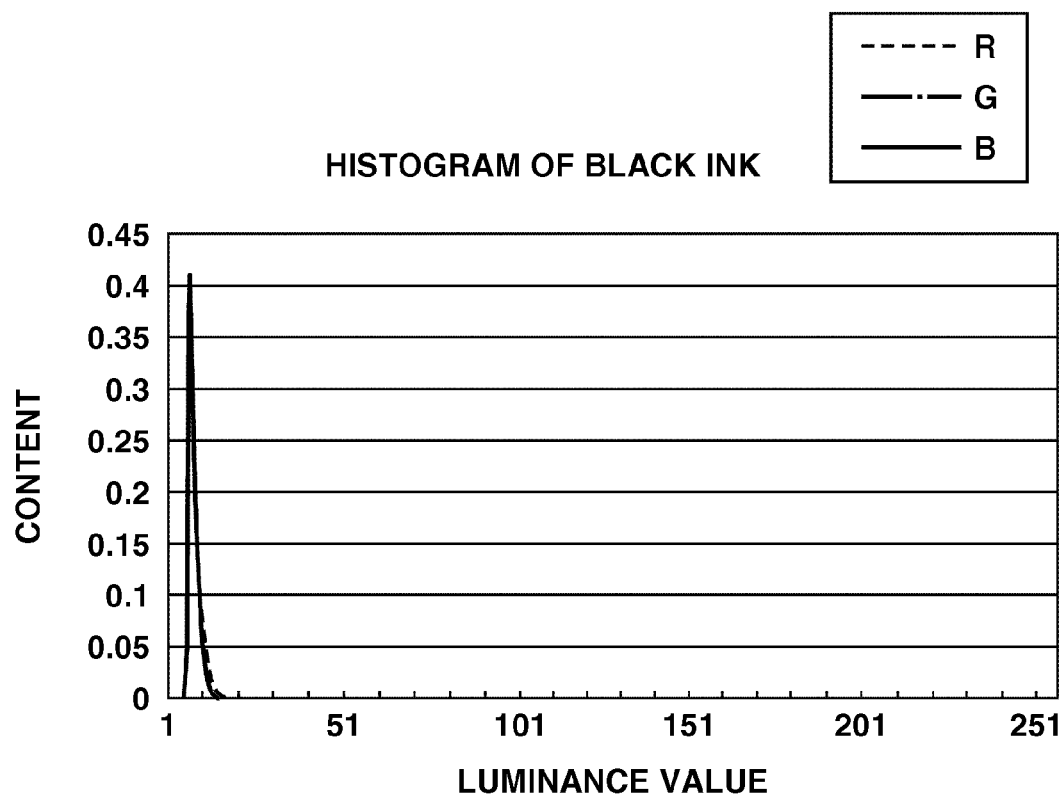
FIG. 10 is a histogram illustrating luminance values of an image of a document written with a black pen.

FIG. 10 is a histogram illustrating luminance values of an image of a document written with a black pen. The histogram illustrated in FIG. 10 can be obtained by scanning a paper on which a line or the like is written with a black pen and analyzing a scanned image. As illustrated in FIG. 10, the color-difference of the black color is small and the luminance values are small. Therefore, the possibility that the average of luminance values of the pixel belonging to an image of a document written with a black pen is less than LUM_MIN is high.

If it is determined that the luminance value is less than the predetermined value (YES in step S7-3), then in step S7-5, the CPU 2-403 determines that the target pixel does not belong to the pale printed image. If it is determined that the luminance value is equal to or greater than the predetermined value (NO in step S7-3), then in step S7-4, the CPU 2-403 determines that the target pixel belongs to the pale printed image. In short, the CPU 2-403 can detect the fluorescent color in step S7-2 and detect the black or dark color in step S7-3.

In the first exemplary embodiment, the threshold in step S7-3 (i.e., the value used for the determination) is the average of RGB luminance values. However, the processing in step S7-3 can be modified in the following manner. For example, it may be useful to set a lowest threshold and a highest threshold for the average of RGB luminance values for determination. For example, it may be useful to set the lowest threshold or to set both of the lowest and the highest threshold for each of the RGB luminance values for determination. In respective cases, all of the effective thresholds to be used need to be stored beforehand in the RAM 2-402 or be generated while analyzing.

If it is determined that the target pixel belongs to the pale printed image in step S7-4, the CPU 2-403 stores the determination information as part of the mask data. If it is determined that the target pixel does not belong to the pale printed image in step S7-5, the CPU 2-403 stores the determination information as part of the mask data.

In the present exemplary embodiment, information is added to the mask data stored in the RAM 2-402 in the following manner. The CPU 2-403 adds 1 to the mask data if the target pixel is determined as belonging to the pale printed image and adds 0 if the target pixel is determined as not belonging to the pale printed image.

In step S7-6, if it is determined that the determinations in steps S7-2 and S7-3 have not been completed for all pixels (NO in step S7-6), then in S7-7, the CPU 2-403 shifts the processing target to the next pixel. Whereas if the determination processing in steps S7-2 and S7-3 has been completed for all pixels of the image in the handwriting area 3-4 (YES in step S7-6), then in step S6-8, the CPU 2-403 generates the completed mask data. The completed mask data may include a noise component if the extracted image includes an irregular pixel. Accordingly, in step S6-8, the CPU 2-403 performs processing for deleting the noise component. The noise removal processing may be, for example, median filtering or isolated point removal filtering.

In step S6-9 illustrated in FIG. 6, the CPU 2-403 generates a combination result based on the mask data generated in step S6-8, the image in the handwriting area 3-4, and the combination target image. An example procedure for combining three images (i.e., the mask data, the image in the handwriting area 3-4, and the combination target image) is described below.

First, based on designation information of the combination target image stored in the RAM 2-402, the CPU 2-403 loads the combination target image from the storage medium 2-303 into the RAM 2-402 to rasterize the image. Next, the CPU 2-403 converts the combination target image, the image in the handwriting area 3-4, and the mask data so as to have the same resolution.

The pale printed image can be generated by trimming the combination target image beforehand. The trimming information is recorded in the sheet discrimination mark 3-1 on the handwritten document sheet SH1. The CPU 2-403 analysis the trimming information in step S6-4 and stores the analysis result in the RAM 2-402. The CPU 2-403 identifies a pixel of the combination target image that serves as a start point (i.e., a combination center), based on this information, when the image in the handwriting area 3-4 is combined with the mask data.

After the combination center is determined, the CPU 2-403 combines the handwritten image with the combination target image in the following manner. In this case, the combination target image serves as a background image. First, the CPU 2-403 causes the scanner unit 2-100 to scan the mask data to find a pixel having a value 1. Then, the CPU 2-403 finds a pixel of image data in the handwriting area 3-4 and a pixel of the combination target image that are present at the position corresponding to the found mask data. If these pixels are found, the CPU 2-403 overwrites the pixel of the combination target image with the pixel of the image data positioned at the corresponding position in the handwriting area 3-4. The CPU 2-403 executes the above-described processing for all pieces of the mask data, so that the pixel serving as part of a handwritten image among all pixels constituting the image data in the handwriting area 3-4 can be combined with the combination target image.

Figure 12:
FIG. 12 illustrates an example of a combination result using a handwritten document sheet.

FIG. 12 illustrates an example of a combination result using the handwritten document sheet SH1. The CPU 2-403 reads a size designated in the sheet selection area 3-2 from the information stored in the RAM 2-402, adjusts the size of the combination result according to the designated size, and generates print data. The CPU 2-403 transmits the generated print data to the print data control unit 2-204 of the printer unit 2-200. The printer unit 2-200 starts printing an image based on the received print data.

In the first exemplary embodiment, the image existing in the handwriting area 3-4 has been described as being limited to the pale printed image or the handwritten image. If any other image is present in the handwriting area 3-4, the CPU 2-403 can determine whether the image in the handwriting area 3-4 belongs to the pale printed image. For example, an image of a fixed phrase may be present in the handwriting area 3-4. The fixed phrase is neither the pale printed image nor the handwritten image. Such an image may be used when a user wants to combine a fixed phrase and a handwritten image with a combination target image.

With the above-described configuration, the control unit can extract not only the higher-density color but also the fluorescent color from the handwriting area 3-4 where the pale printed image is present. In other words, the present exemplary embodiment allows users to perform handwriting entry with many colors.

In a second exemplary embodiment, a handwritten document sheet SH2 includes a space for notifying a color of a sheet on which the handwritten document sheet SH2 is printed. This space is referred to as a sheet detection area 13-6. The sheet detection area 13-6 can be provided as part of the print data for the handwritten document sheet SH2.

Figure 13:
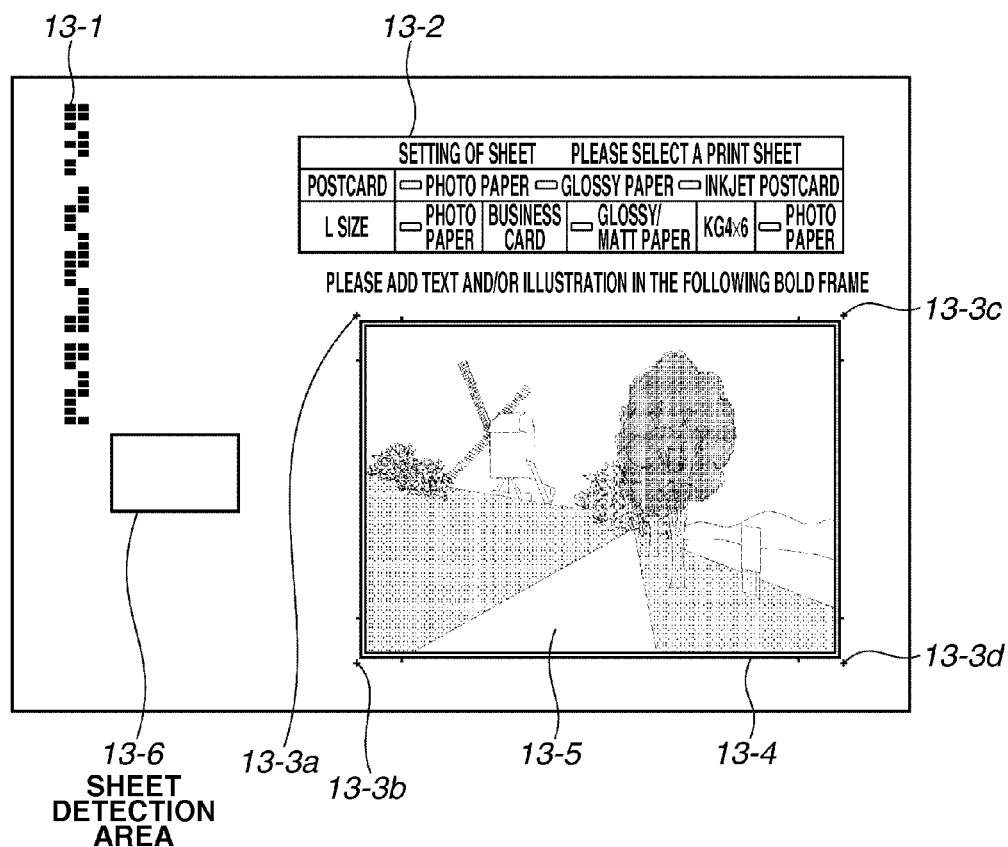
FIG. 13 illustrates an example of a handwritten document sheet that includes a sheet detection area according to a second exemplary embodiment.

FIG. 13 illustrates an example of the handwritten document sheet SH2 including the sheet detection area 13-6 that can be used according to the second exemplary embodiment. The sheet detection area 13-6 according to the second exemplary embodiment is a rectangular area defined by a black frame line. Indicating an object area with the black frame is effective to enable users to easily identify a specific area and prevent the users from writing into the sheet detection area 13-6 in error. Alternatively, a text or an illustration may be used to clearly indicate the sheet detection area 13-6. The rest of the apparatus configuration and a method for printing the handwritten document sheet SH2 are similar to those described in the first exemplary embodiment, thus their descriptions are not repeated.

Figure 14:
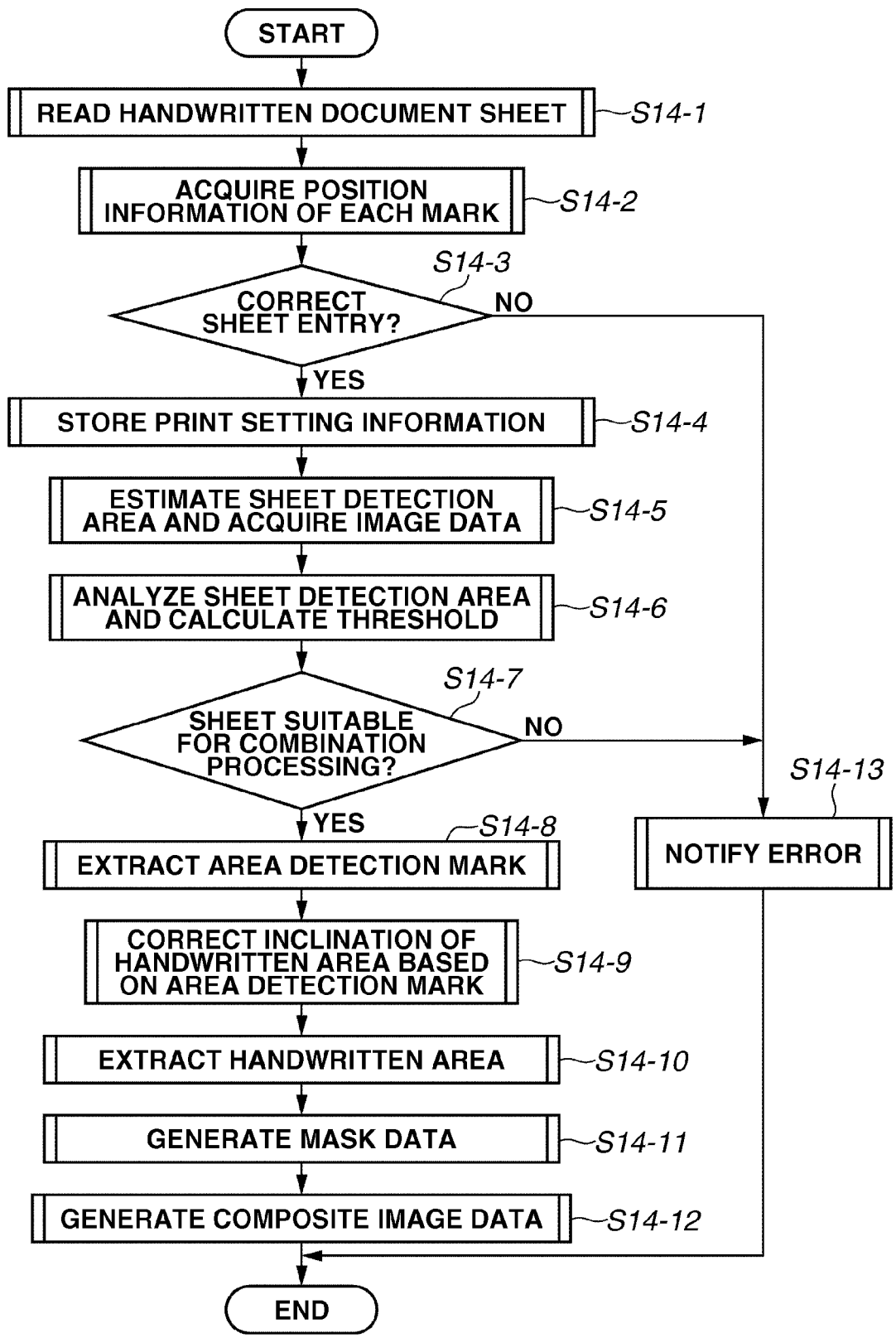
FIG. 14 is a flowchart illustrating an example operation for analyzing a sheet using the handwritten document sheet including the sheet detection area according to the second exemplary embodiment.

FIG. 14 is a flowchart illustrating an example operation for analyzing a sheet using the handwritten document sheet SH2 including the sheet detection area 13-6 according to the second exemplary embodiment. Processing in steps S14-1 to S14-4 is similar to the processing in steps S6-1 to S6-4 in FIG. 6 described in the first exemplary embodiment, thus their descriptions are not repeated.

In step S14-5, the CPU 2-403 estimates a position of the sheet detection area 13-6 based on a positional relationship with the sheet discrimination mark 3-1. Then, the CPU 2-403 causes the scanner unit 2-100 to acquire image data of the sheet detection area 13-6 at the estimated position and stores the acquired image data in the RAM 2-402.

In step S14-6, the CPU 2-403 analyzes the image data acquired in step S14-5 and obtains color characteristics information of the sheet on which the handwritten document sheet SH2 is printed. The CPU 2-403 generates two thresholds SAT_MAX and LUM_MIN (i.e., the values used for discriminating the pale printed image from the handwritten image) based on the obtained color characteristics information of the sheet. The following is the reason why the thresholds SAT_MAX and LUM_MIN are generated from the color characteristics information of the sheet.

First, if an ink droplet to be used for the printer unit that forms a pale printed image is made of a material whose color characteristics are susceptible to property of a sheet (i.e., a printing sheet), the output obtained by reading the pale printed image formed thereon is greatly variable depending on the property of the sheet. For example, if a pale printed image is formed on a sheet having a large R luminance value, the output obtainable by scanning the pale printed image has a large R luminance value.

Similarly, if a histogram of RGB luminance values obtained from a scanned sheet image has a wide distribution, scanning outputs of a pale printed image formed on the sheet with a monotone color has a wide distribution in the histogram.

Figure 15A:
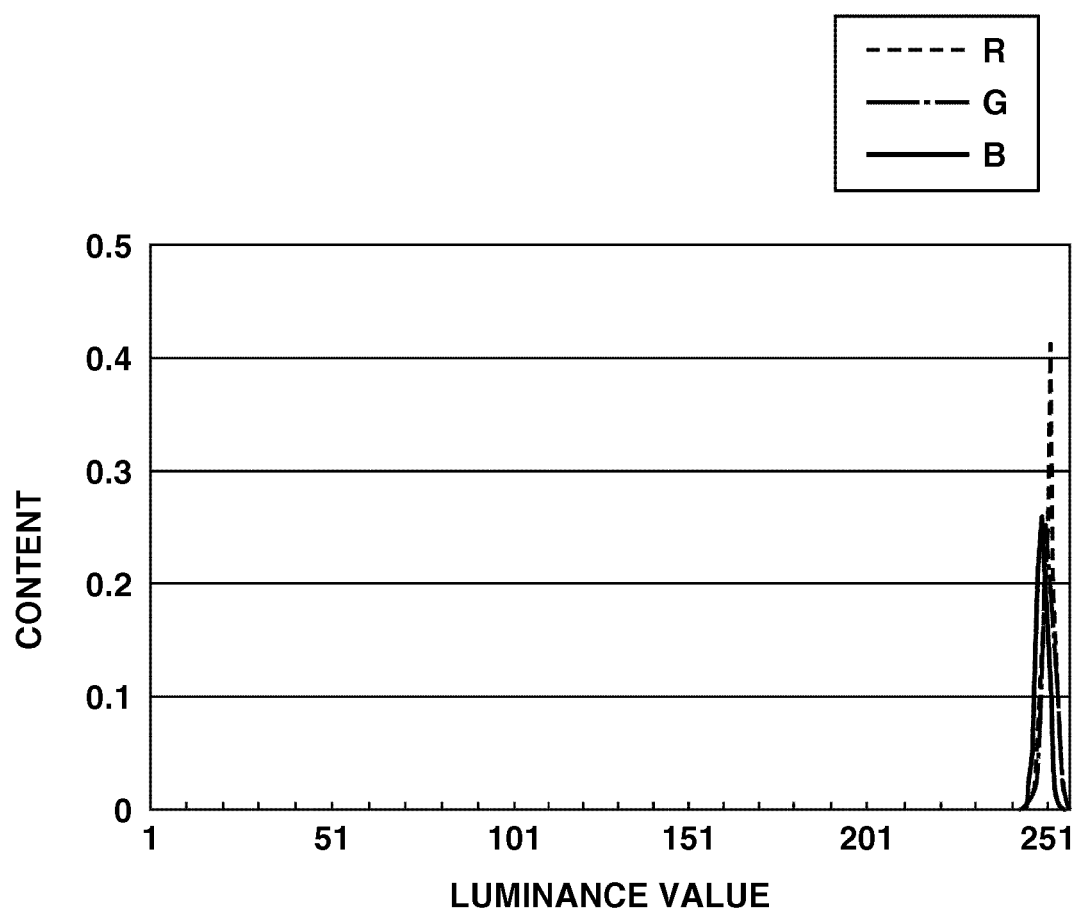
FIG. 15A is a histogram illustrating RGB luminance values that can be obtained when a sheet is directly scanned.
Figure 15B:
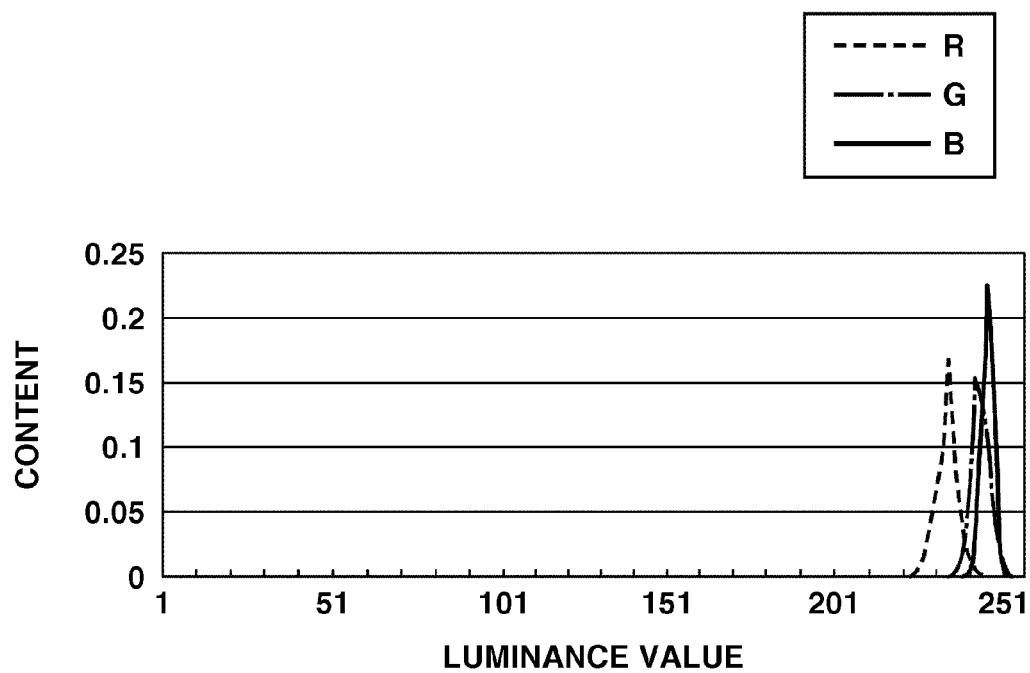
FIG. 15B is a histogram illustrating RGB luminance values that can be obtained by scanning a sheet on which a pale printed image is formed with only a cyan ink.
Figure 15C:
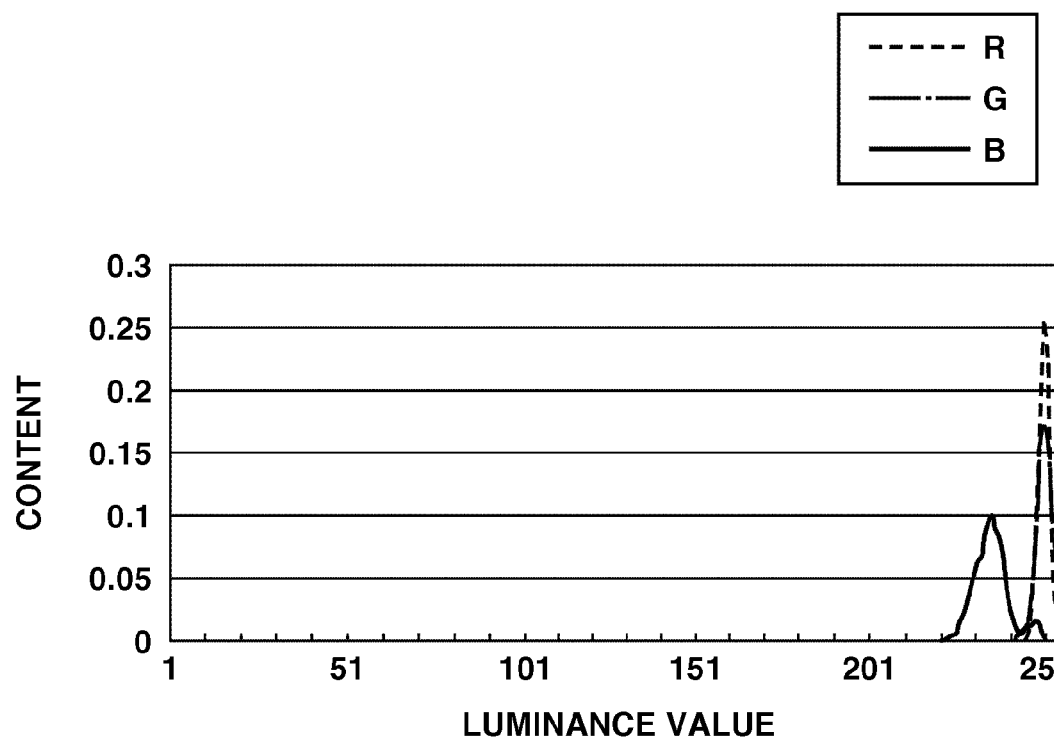
FIG. 15C is a histogram illustrating RGB luminance values that can be obtained by scanning a sheet on which a pale printed image is formed with only a magenta ink.

FIG. 15A is a histogram illustrating RGB luminance values that can be obtained when a sheet 1 is directly scanned. FIG. 15B is a histogram illustrating RGB luminance values that can be obtained by scanning the sheet 1 on which a pale printed image is formed with a cyan ink. FIG. 15C is a histogram illustrating RGB luminance values that can be obtained by scanning the sheet 1 on which a pale printed image is formed with a magenta ink. FIG. 15D is a histogram illustrating RGB luminance values that can be obtained by scanning the sheet 1 on which a pale printed image is formed with a yellow ink.

Figure 16A:
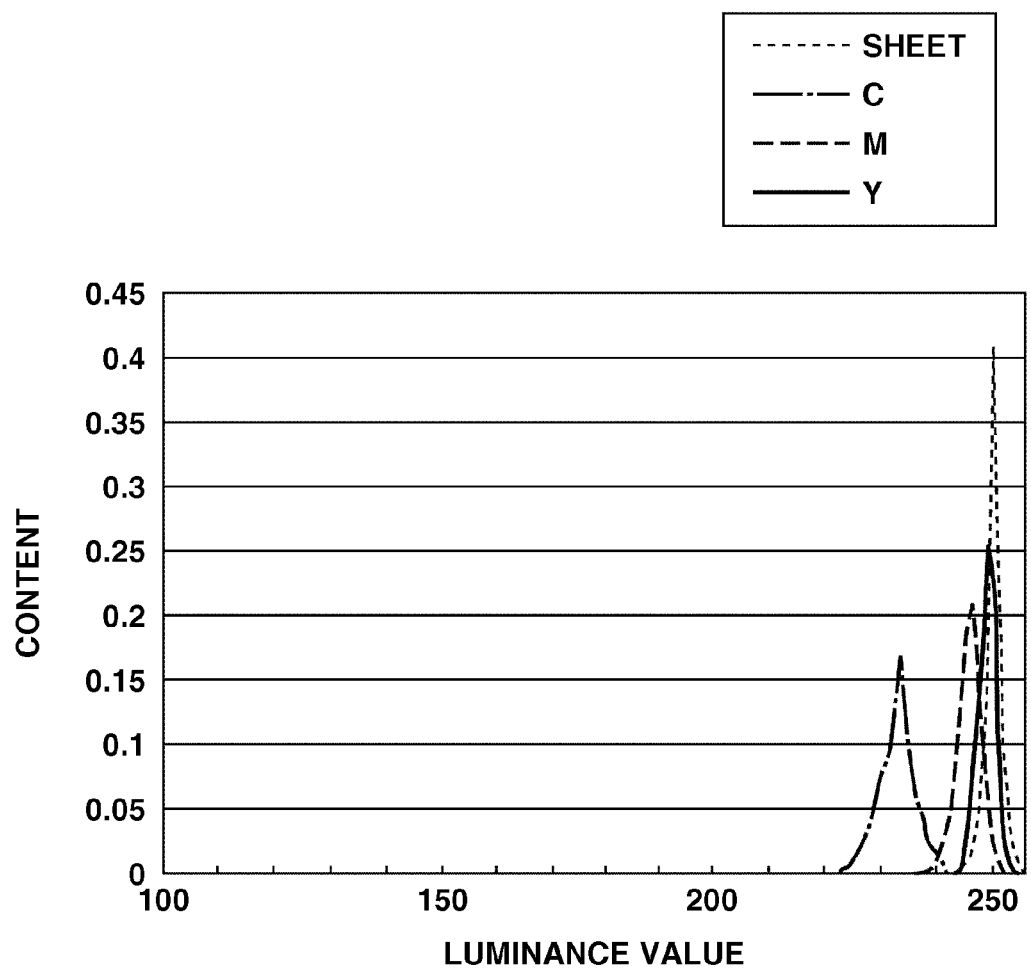
FIG. 16A is a histogram illustrating red (i.e., R) luminance values of a cyan pale printed image, a magenta pale printed image, and a yellow pale printed image that are printed on a sheet.

FIG. 16A is a histogram illustrating R luminance values of the cyan pale printed image, the magenta pale printed image, and the yellow pale printed image that are printed on the sheet 1. FIG. 16B is a histogram illustrating G luminance values of the cyan pale printed image, the magenta pale printed image, and the yellow pale printed image that are printed on the sheet 1. FIG. 16C is a histogram illustrating B luminance values of the cyan pale printed image, the magenta pale printed image, and the yellow pale printed image that are printed on the sheet 1.

Figure 17A:
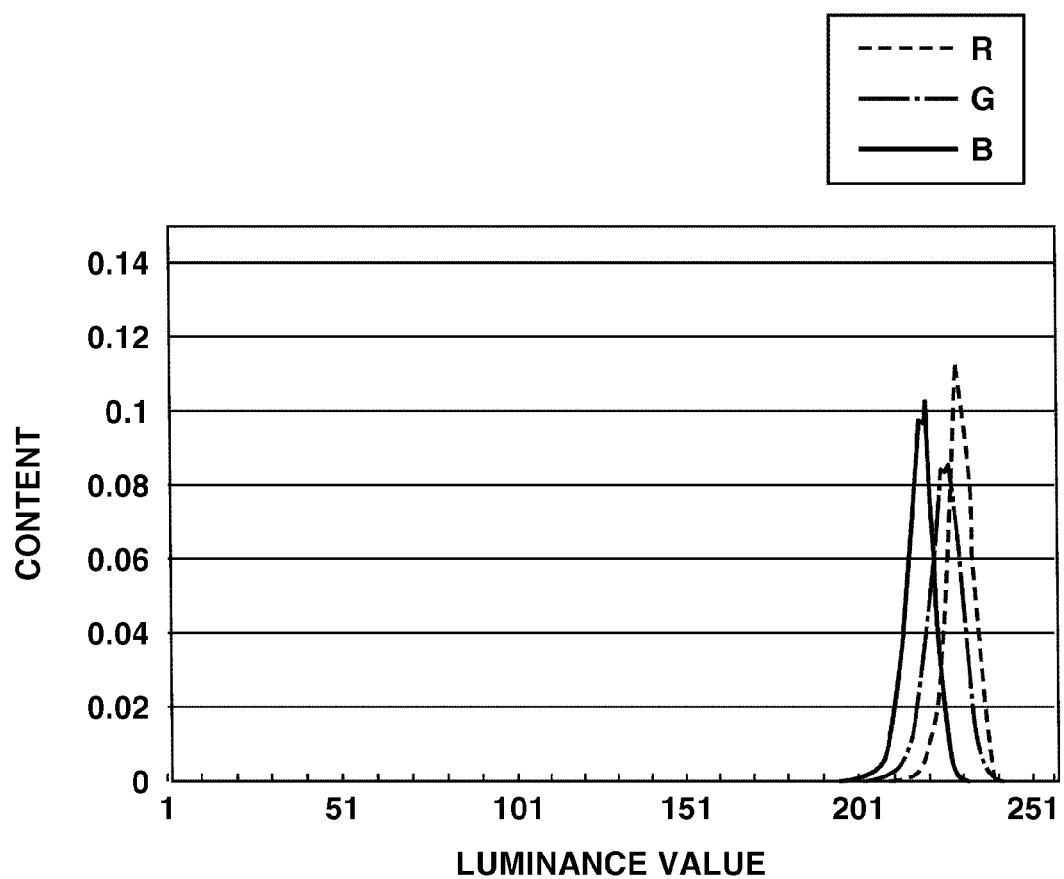
FIG. 17A is a histogram illustrating RGB luminance values that can be obtained when a sheet is directly scanned.
Figure 17B:
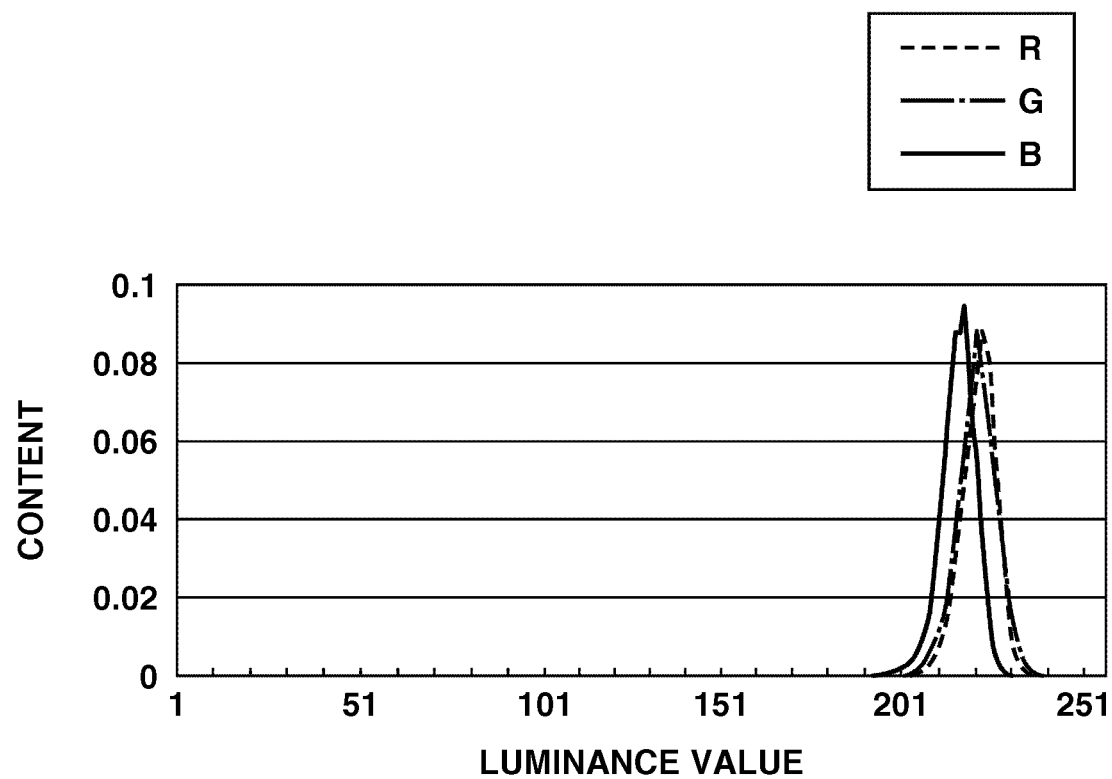
FIG. 17B is a histogram illustrating RGB luminance values that can be obtained by scanning a sheet on which a pale printed image is formed with only a cyan ink.
Figure 17C:
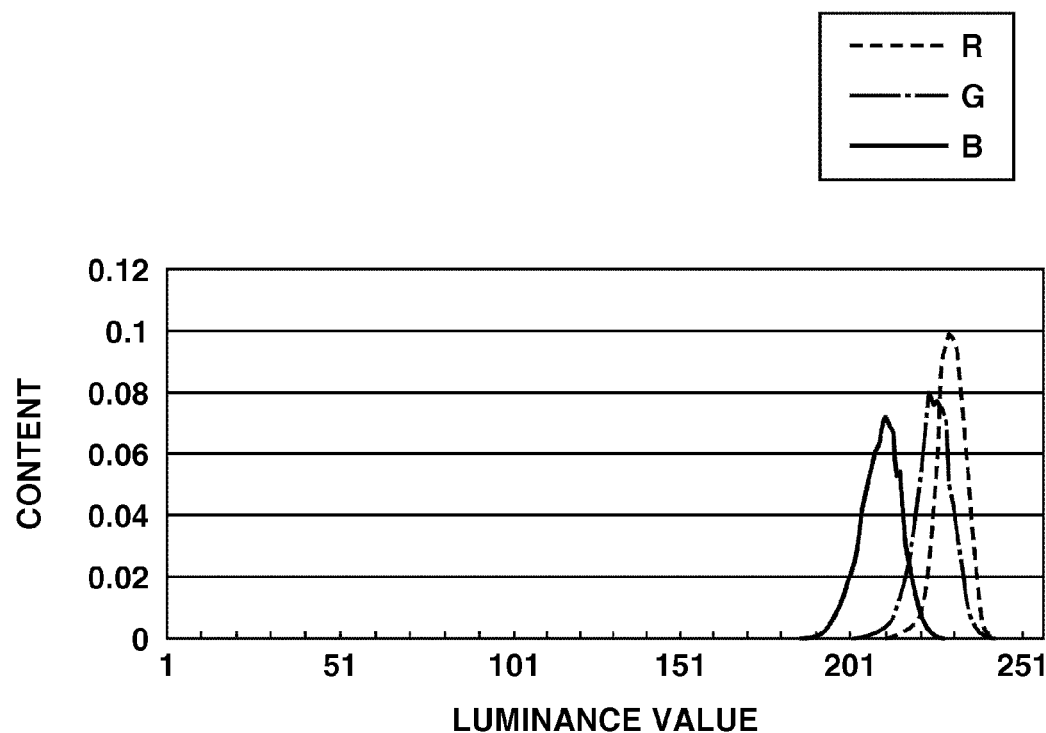
FIG. 17C is a histogram illustrating RGB luminance values that can be obtained by scanning a sheet on which a pale printed image is formed with only a magenta ink.
Figure 17D:
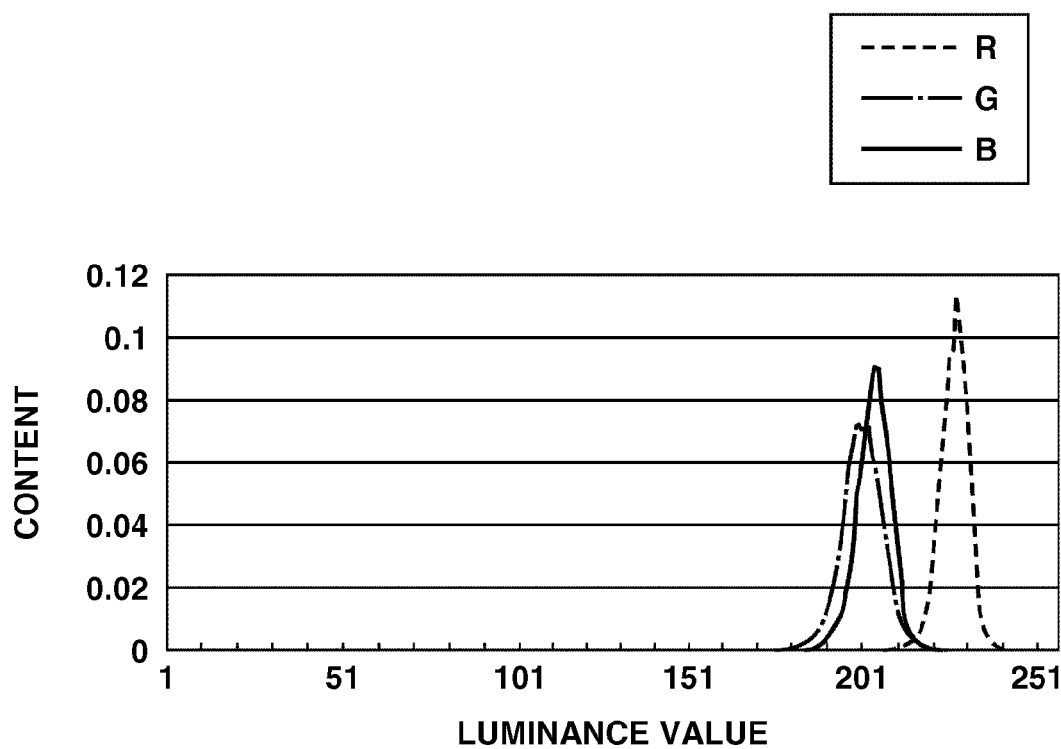
FIG. 17D is a histogram illustrating RGB luminance values that can be obtained by scanning a sheet on which a pale printed image is formed with only a yellow ink.

Next, histograms which can be obtained when a sheet 2 other than the sheet 1 is scanned are illustrated. FIG. 17A is a histogram illustrating RGB luminance values that can be obtained when the sheet 2 is directly scanned. FIG. 17B is a histogram illustrating RGB luminance values that can be obtained by scanning the sheet 2 on which a pale printed image is formed with a cyan ink. FIG. 17C is a histogram illustrating RGB luminance values that can be obtained by scanning the sheet 2 on which a pale printed image is formed with a magenta ink. FIG. 17D is a histogram illustrating RGB luminance values that can be obtained by scanning the sheet 2 on which a pale printed image is formed with a yellow ink.

Figure 18A:
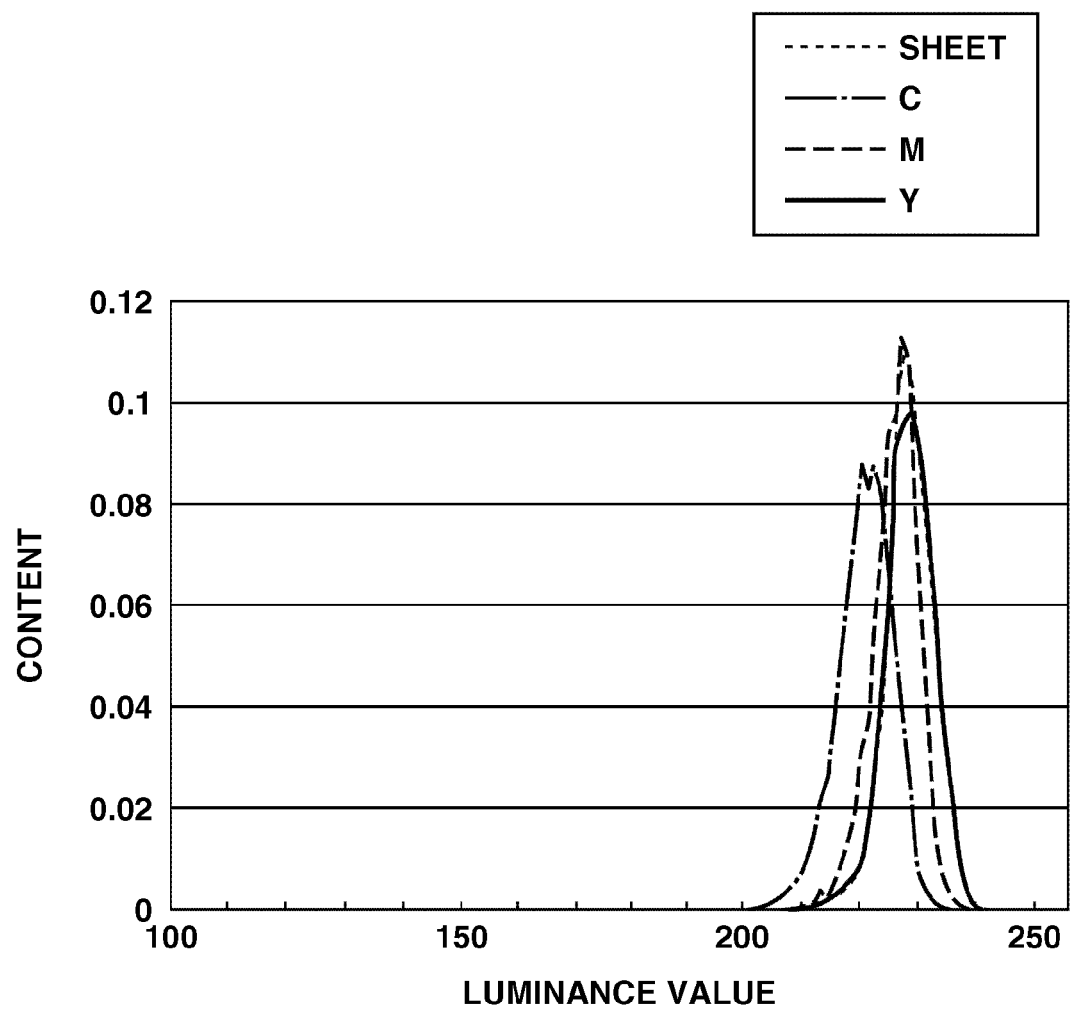
FIG. 18A is a histogram illustrating R luminance values of a cyan pale printed image, a magenta pale printed image, and a yellow pale printed image that are printed on a sheet.
Figure 18B:
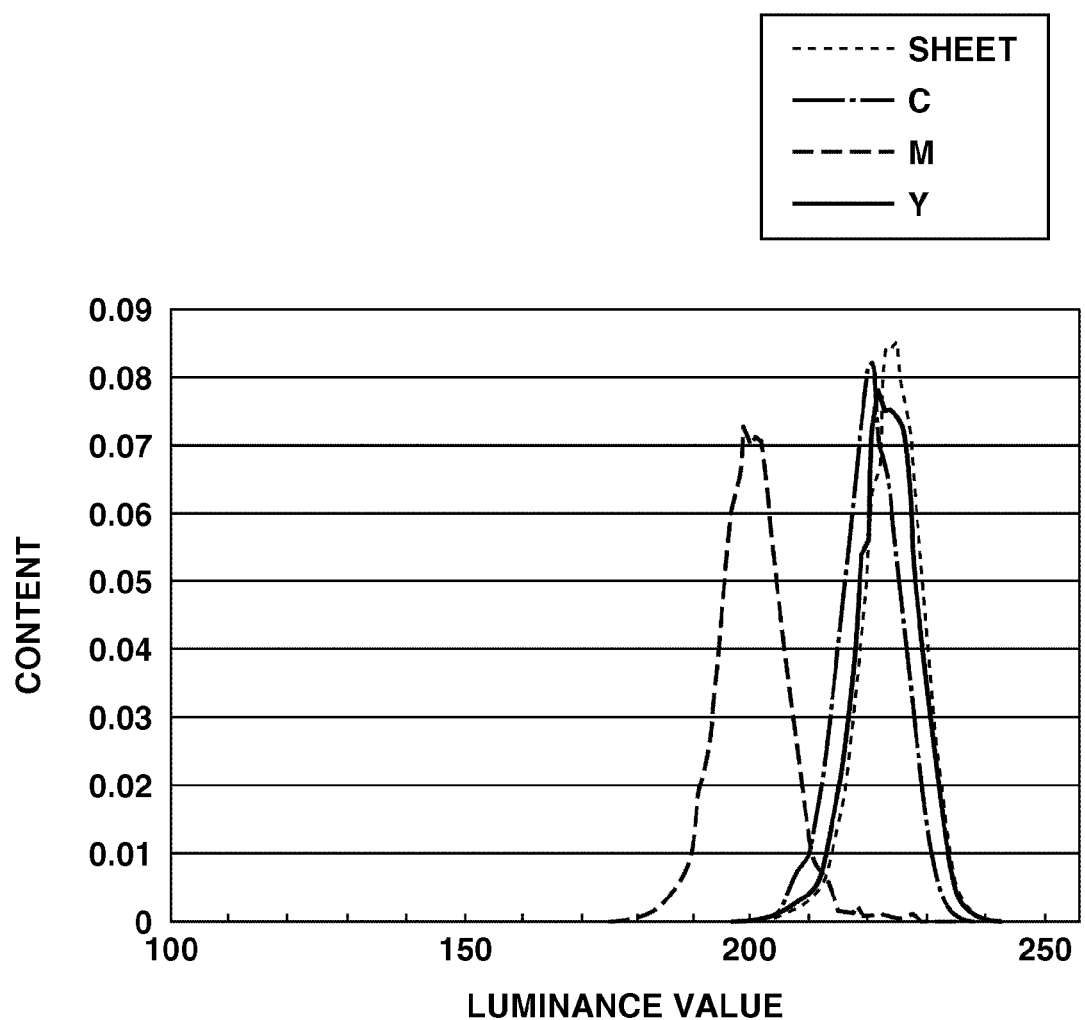
FIG. 18B is a histogram illustrating G luminance values of a cyan pale printed image, a magenta pale printed image, and a yellow pale printed image that are printed on a sheet.
Figure 18C:
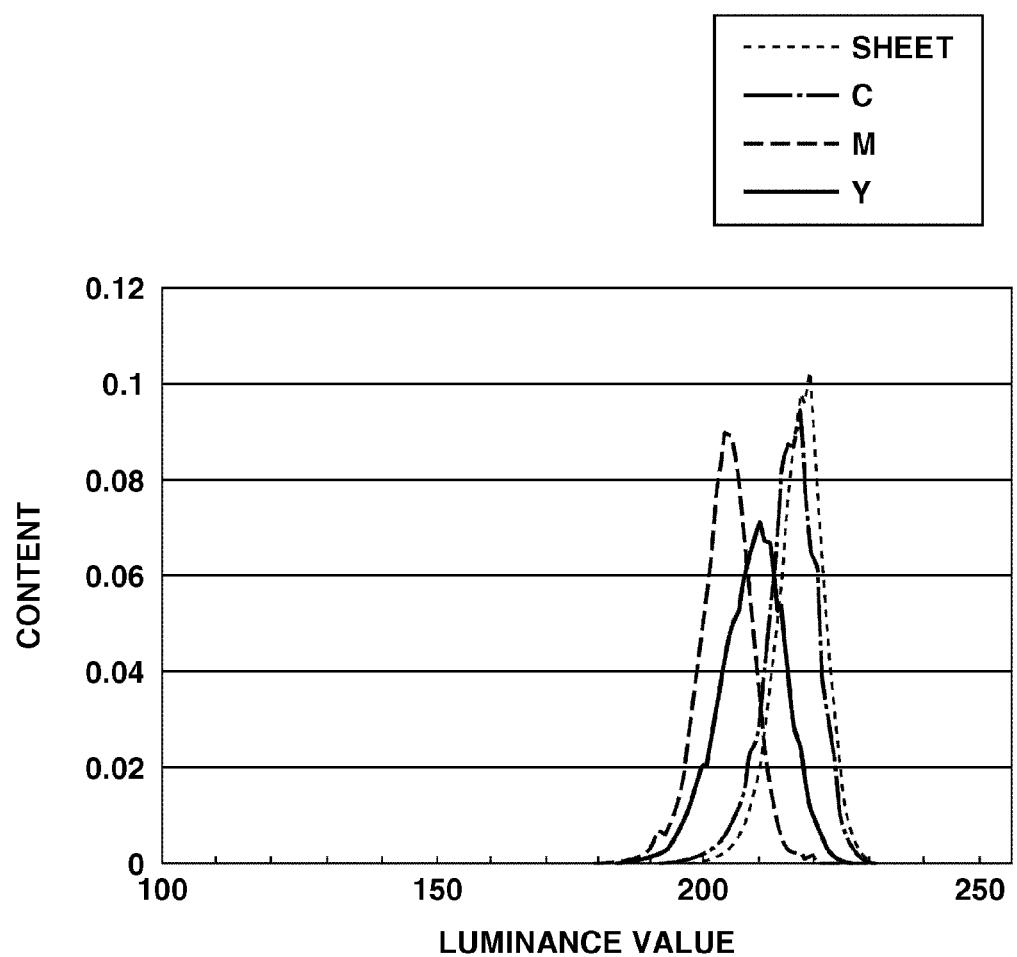
FIG. 18C is a histogram illustrating B luminance values of a cyan pale printed image, a magenta pale printed image, and a yellow pale printed image that are printed on a sheet.

FIG. 18A is a histogram illustrating R luminance values of the cyan pale printed image, the magenta pale printed image, and the yellow pale printed image that are printed on the sheet 2. FIG. 18B is a histogram illustrating G luminance values of the cyan pale printed image, the magenta pale printed image, and the yellow pale printed image that are printed on the sheet 2. FIG. 18C is a histogram illustrating B luminance values of the cyan pale printed image, the magenta pale printed image, and the yellow pale printed image that are printed on the sheet 2.

FIG. 19 illustrates average values and dispersion of RGB luminance values that can be obtained when pale printed images are printed on each sheet. As understood from FIG. 19, the color of each sheet influences the luminance values of respective pale printed images. More specifically, in a case where a pale printed image is formed on the sheet 1 (i.e., the sheet having a large luminance value), the pale printed image has a larger luminance value. On the other hand, in a case where a pale printed image is formed on the sheet 2 (i.e., the sheet having a large dispersion value), the pale printed image has a larger dispersion value. Therefore, considering the above-described characteristics, the CPU 2-403 calculates the thresholds SAT_MAX and LUM_MIN (see step S14-6) based on the image data obtained in step S14-5.

Figure 20A:
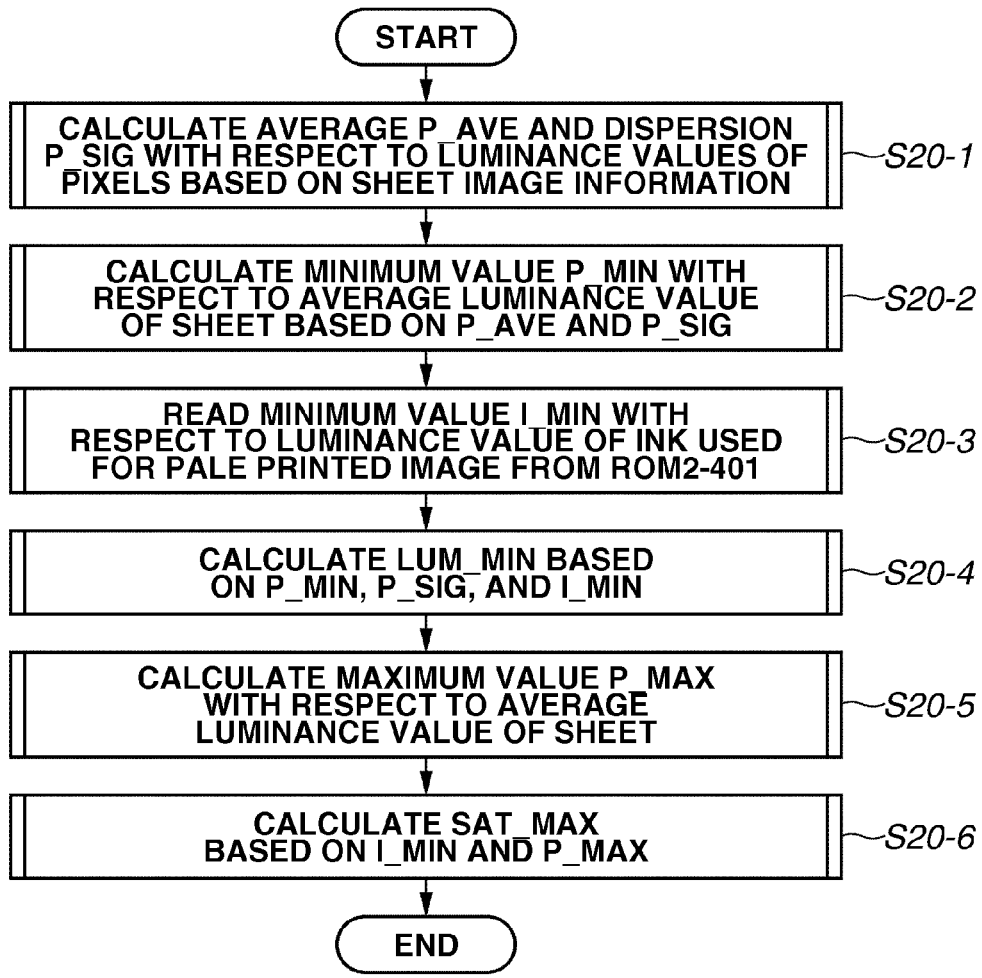
FIG. 20A is a flowchart illustrating an example operation for obtaining thresholds for discriminating a pale printed image from other images based on a color of a sheet on which a handwritten document sheet is printed.
Figure 20B:
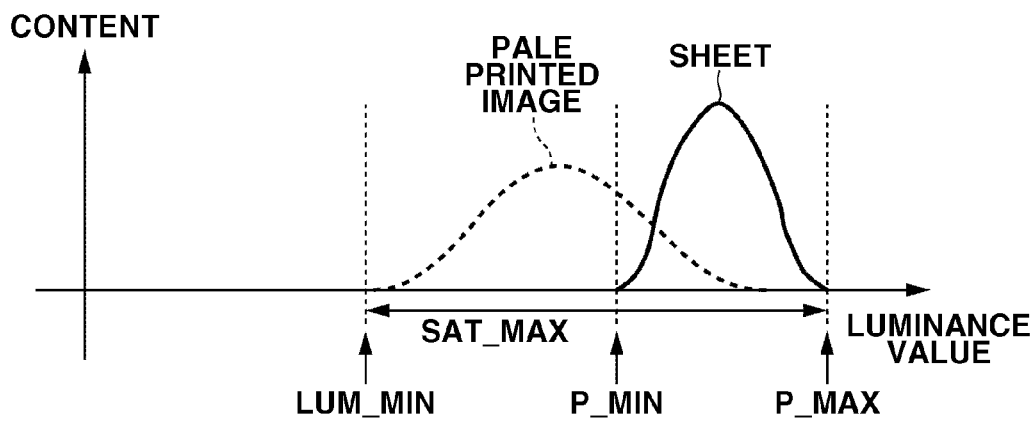
FIG. 20B illustrates numerical values used for the processing illustrated in FIG. 20A.

FIG. 20A is a flowchart illustrating an example operation for obtaining two thresholds SAT_MAX and LUM_MIN (i.e., values to be used for discriminating the pale printed image) based on the color of the sheet on which the handwritten document sheet SH2 is printed. FIG. 20B illustrates numerical values used for the processing illustrated in FIG. 20A.

In step S20-1, the CPU 2-403 calculates an average value P_AVE and dispersion P_SIG of the luminance values of all pixels based on the image information of the sheet obtained in step S14-5.

In step S20-2, the CPU 2-403 calculates a lowest value P_MIN of the average RGB luminance value of the sheet based on the obtained values P_AVE and P_SIG.

In step S20-3, the CPU 2-403 reads ink color characteristics information which is stored beforehand from the ROM 2-401. Then, the CPU 2-403 reads information of a color having the lowest luminance value among the colors used for forming the pale printed image. The CPU 2-403 generates a minimum value I_MIN of the pale printed image which can be theoretically taken based on the above-described two pieces of information.

In step S20-4, the CPU 2-403 estimates the sheet based on the lowest value P_MIN of the sheet luminance value and the sheet dispersion value P_SIG with respect to the theoretical minimum value I_MIN of the pale printed image and calculates a lowest value LUM_MIN of the average luminance value of the scanned pale printed image.

In step S20-5, the CPU 2-403 calculates a maximum value P_MAX of the average RGB luminance value of the sheet based on P_AVE and P_SIG.

In step S20-6, the CPU 2-403 calculates the threshold SAT_MAX based on I_MIN and P_MAX.

According to the above-described processing, the CPU 2-403 can analyze the sheet detection area 13-6 and calculate the thresholds in step S14-6 illustrated in FIG. 14. In the second exemplary embodiment, the CPU 2-403 uses the obtained thresholds SAT_MAX and LUM_MIN to separately extract the pale printed image and the handwritten image.

In step S14-7, the CPU 2-403 determines whether the sheet is suitable for the combination processing based on the analysis result in step S14-6. For example, if the printed sheet has an extremely dark color, the accuracy deteriorates in the above-described processing for discriminating the pale printed image from the handwritten image. Therefore, the CPU 2-403 determines that the sheet is not suitable for the combination processing and it is an error. If the printed sheet has extremely large color-difference colors (e.g., red and blue), the accuracy deteriorates in the above-described processing for discriminating the pale printed image from the handwritten image. In such a case, the threshold SAT_MAX becomes an extremely large value and the threshold LUM_MIN becomes an extremely small value. Therefore, the CPU 2-403 can discriminate the sheet.

Hence, in step S14-7, the CPU 2-403 calculates the accuracy in discriminating the images according to the sheet based on the analysis result in step S14-6. As an example method, the ROM 2-401 can store an accuracy calculation table associated with the thresholds SAT_MAX and LUM_MIN.

An example of the above-described accuracy detection table is described below. It is assumed, from the sheet color information, that SAT_MAX is 200 and LUM_MIN is 170. This sheet has an excessively large color-difference and therefore it is difficult to accurately discriminate the pale printed image. Hence, in the accuracy detection table, the maximum value of the accuracy is set to 100 and the lowest value is set to 0. Further, the accuracy corresponding to SAT_MAX=200 and LUM_MIN=170 in the accuracy detection table is set to 10. The setting values are registered in the ROM 2-401. Further, the threshold of the accuracy for determining the error is set to 50. In this case, if the handwritten document sheet SH2 is printed on a sheet which has an extraordinary color, the determination value does not exceed the threshold of the accuracy and is therefore determined as error.

As another method not using a simple table for the calculation, it may be useful to use an appropriate calculation formula to detect the accuracy. If the accuracy obtained by performing such accuracy verification reaches a predetermined level, the CPU 2-403 continues the analysis. If the obtained accuracy does not reach the predetermined level (NO in step S14-7), then in step S14-13, the CPU 2-403 performs error notification for the user and terminates the processing of the routine illustrated in FIG. 14. Processing in steps S14-8 to S14-13 is similar to the processing in steps S6-5 to S6-10 illustrated in FIG. 6 in the first exemplary embodiment, thus their descriptions are not repeated.

With the above-described configuration, the control unit determines thresholds referring to color characteristics information of a sheet generated based on the image data of the sheet. Therefore, the control unit can accurately extract the handwritten image from the handwriting area 3-4 in which the pale printed image is present. The control unit can combine the extracted handwritten image with the combination target image.

The second exemplary embodiment is, for example, very effective in such a case where the printer unit configured to form a pale printed image discharges an ink droplet whose material has color characteristics susceptible to the property of a sheet (i.e., a printing sheet). If the ink droplet includes a pigment ink, both the average luminance value and the histogram distribution tend to be influenced by the sheet property than a dye ink. In such a case, the control unit can perform sufficiently accurate determination by setting the above-described thresholds SAT_MAX and LUM_MIN according to the ink distribution characteristics described in the first exemplary embodiment.

In a third exemplary embodiment, an apparatus configuration and a method for printing a handwritten document sheet SH3 are similar to those described in the first exemplary embodiment, thus their descriptions are not repeated.

Figure 21:
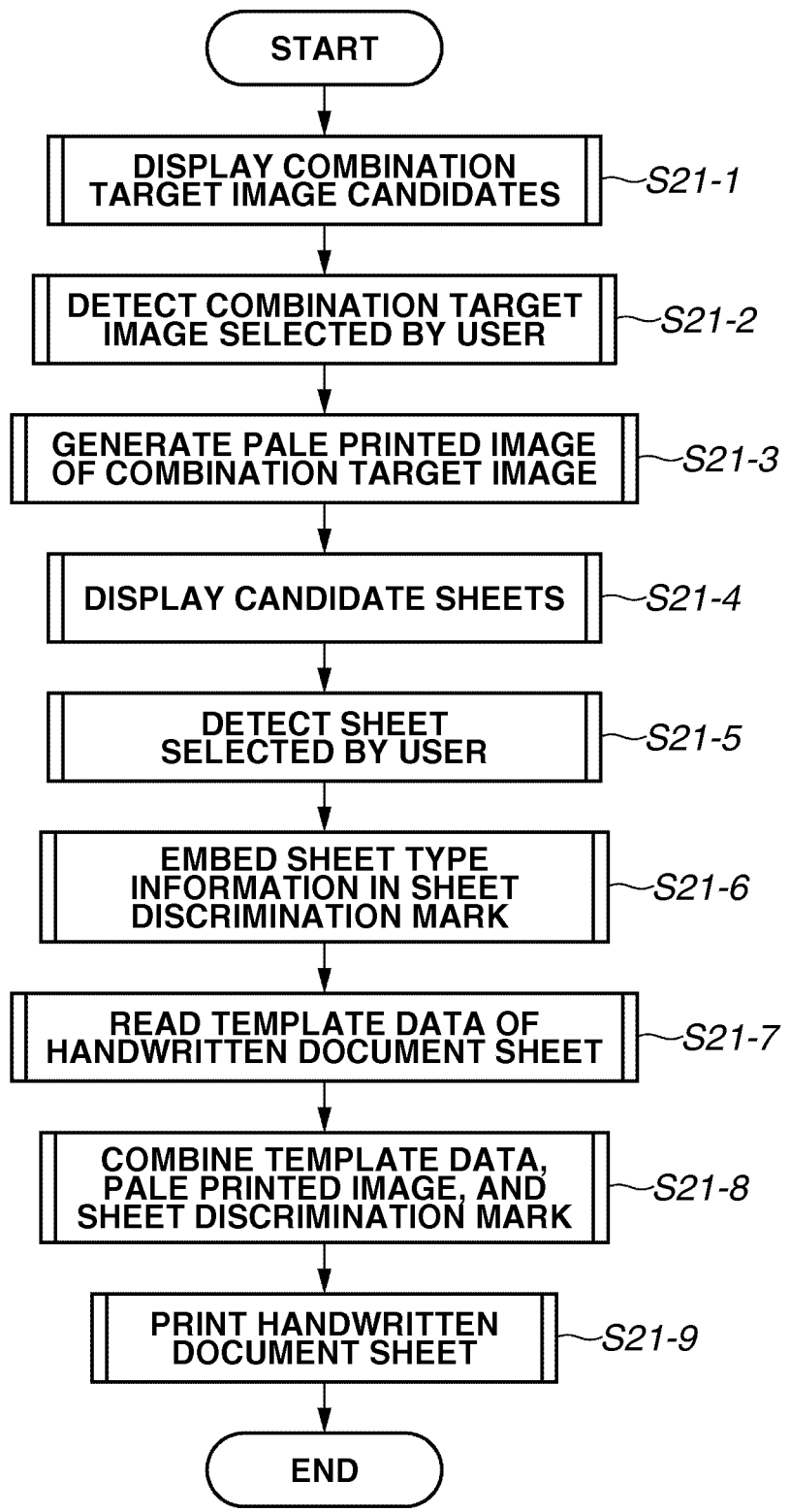
FIG. 21 is a flowchart illustrating an example operation for printing a handwritten document sheet according to a third exemplary embodiment.

FIG. 21 is a flowchart illustrating an example operation for printing the handwritten document sheet SH3 according to the third exemplary embodiment. Processing in steps S21-1 to S21-3 is similar to the processing in steps S4-1, S4-2 and S4-4 described in the first exemplary embodiment, thus their descriptions are not repeated.

In step S21-4, the CPU 2-403 causes the UI unit 2-301 to display a list of sheets that are usable for the handwritten document sheet SH3. The above-described list can be generated referring to sheet types suitable for the handwritten document sheet SH3 registered beforehand in the ROM 2-401. A name indicating each sheet type may be a product name or a general name (e.g., "glossy paper", "inkjet paper", and "recycled paper." It may be useful to use more easily understandable expressions, such as "smooth paper" and "plain paper", for any users who are unfamiliar with the above-described names.

A user operates the UI unit 2-301 to select a sheet type to be used as the handwritten document sheet SH3 from a displayed list of sheet types. Then, the processing proceeds to step S21-5. In step S21-5, the CPU 2-403 detects the sheet type designated by the user in step S21-4. Then, in step S21-6, the CPU 2-403 embeds the information into the sheet discrimination mark 3-1.

Processing in the subsequent steps S21-7 to S21-9 is similar to the processing in steps S4-5 to S4-7 described in the first exemplary embodiment, thus their descriptions are not repeated.

As described above, the handwritten document sheet SH3 is printed for the user. When the sheet is printed, the user can draw a handwritten image to be combined with the combination target image in the handwriting area 3-4 of the sheet. After completing the drawing, the user operates the MFP 100 to scan the handwritten document sheet SH3 and the processing for combining the handwritten image and the combination target image starts.

Figure 22:
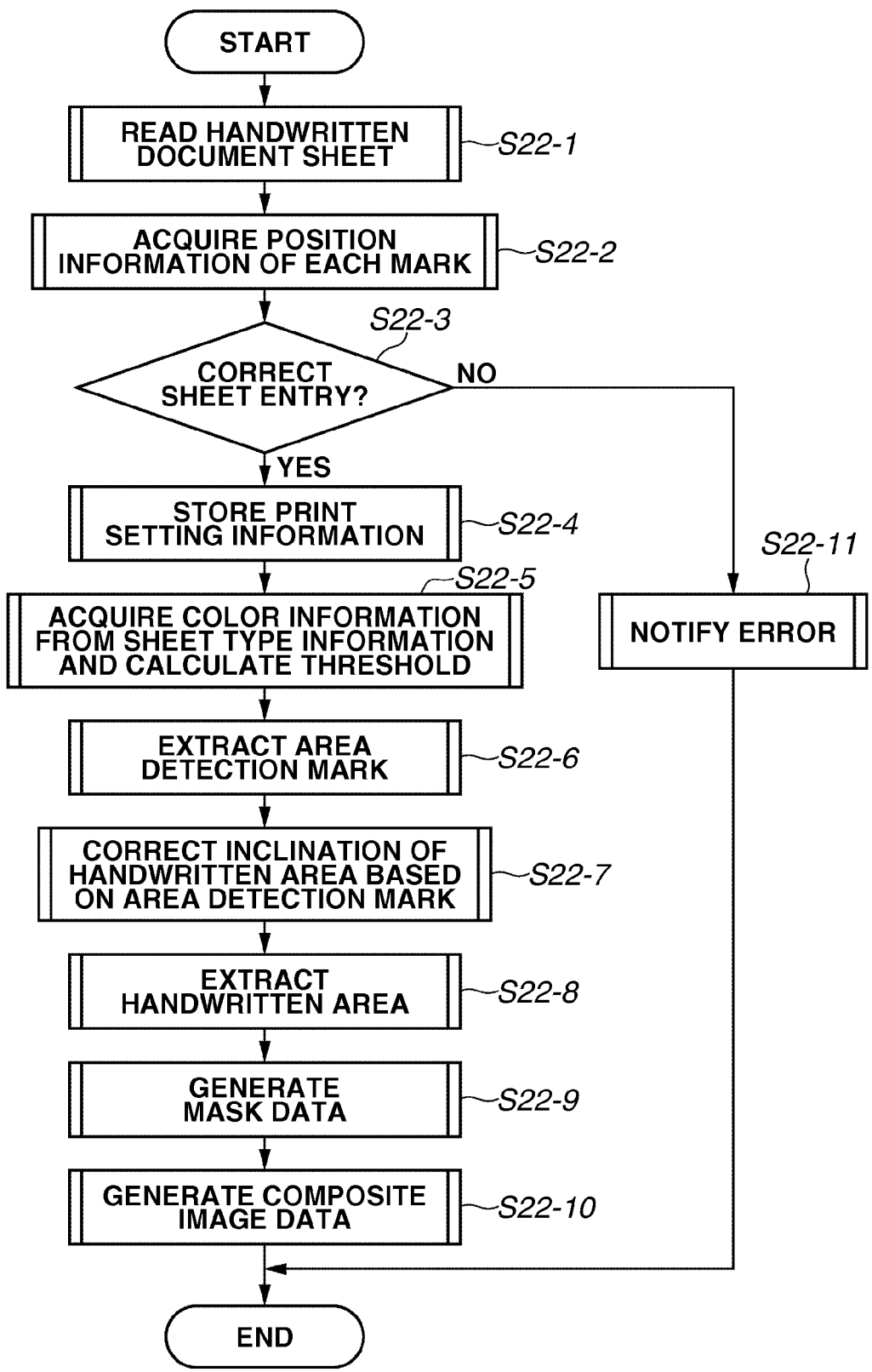
FIG. 22 is a flowchart illustrating an example operation for reading a handwritten document sheet according to the third exemplary embodiment.

FIG. 22 is a flowchart illustrating an example operation for reading the handwritten document sheet SH3 according to the third exemplary embodiment. Processing in steps S22-1 to S22-4 is similar to the processing in steps S14-1 to S14-4 described in the second exemplary embodiment, thus their descriptions are not repeated.

In step S22-5, the CPU 2-403 detects information indicating the sheet type of the handwritten document sheet SH3 recorded in the sheet discrimination mark 3-1. After the information indicating the sheet type is detected, the CPU 2-403 obtains color characteristics information corresponding to the detected sheet type from the ROM 2-401 that stores sheet color characteristics information beforehand. The CPU 2-403 performs processing illustrated in FIG. 20A to calculate thresholds SAT_MAX and LUM_MIN based on the color characteristics information. Processing in steps S22-6 to S22-11 is similar to the processing in steps S14-8 to S14-13 illustrated in FIG. 14 described in the second exemplary embodiment, thus their descriptions are not repeated.

With the above-described configuration, the control unit enables users to select a sheet type and obtain sheet information based on the selected sheet type. Therefore, the control unit can accurately extract a handwritten image from the handwriting area 3-4 where the pale printed image is located without reading the color of the sheet. The control unit can combine the extracted handwritten image with the combination target image.

In the third exemplary embodiment, the control unit stores information relating to the selected sheet type in the sheet discrimination mark 3-1. Alternatively, the control unit may allow users to designate a sheet type when the MFP performs reading processing. If a sheet on which sheet type information is recorded beforehand is used, the control unit can generate color characteristics information referring to the recorded sheet type information.

The lowest luminance value of an image obtained by scanning on a pale printed image of a handwritten document sheet SH4 is changeable according to a combination target image that serves as the pale printed image. Therefore, in a fourth exemplary embodiment, the control unit obtains a threshold to be used to extract a handwritten image based on the luminance value of the combination target image. In the fourth exemplary embodiment, an apparatus configuration and a method for printing the handwritten document sheet SH4 are similar to those described in the first exemplary embodiment, thus their descriptions are not repeated.

Figure 23:
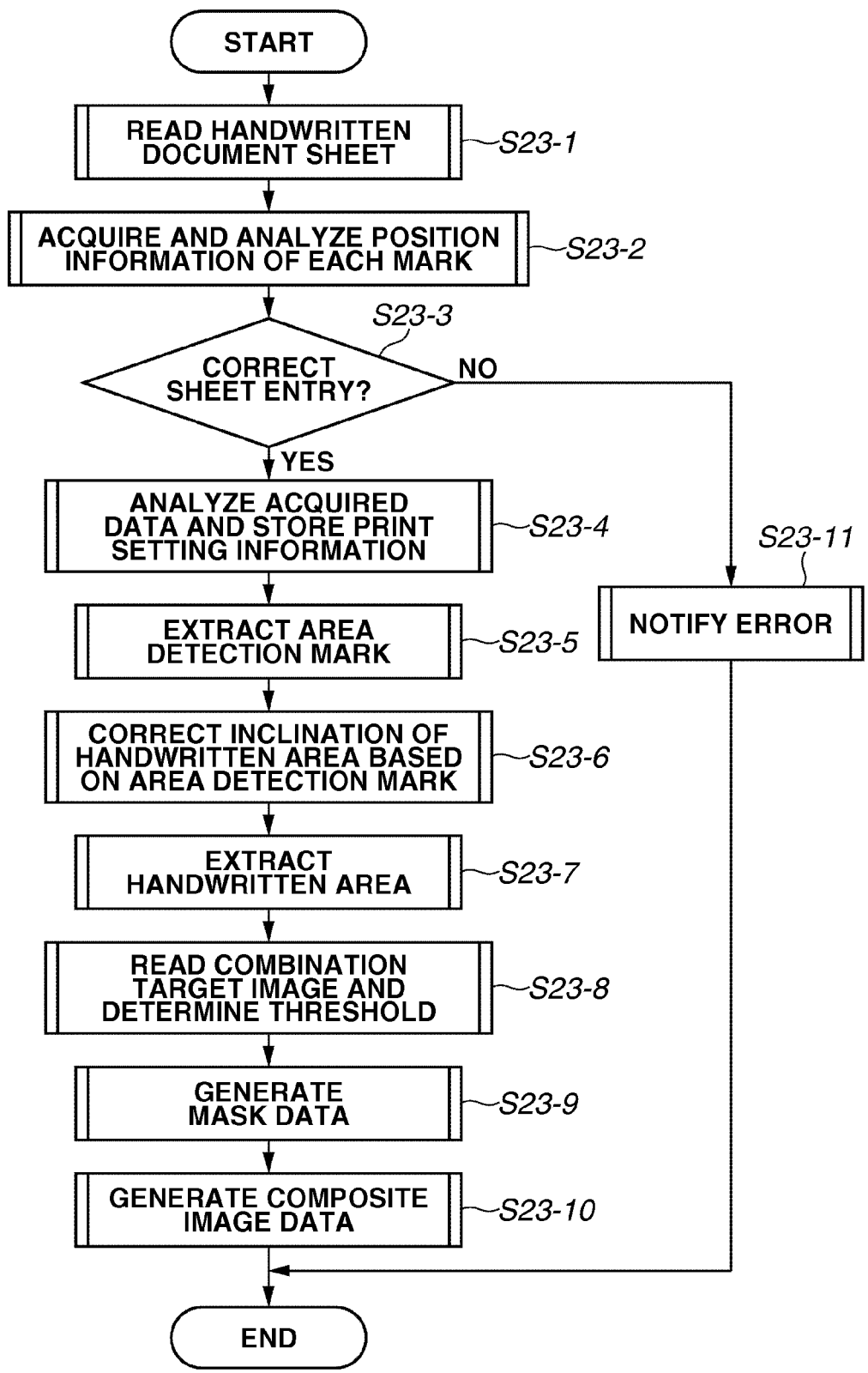
FIG. 23 is a flowchart illustrating an example operation for reading a handwritten document sheet according to a fourth exemplary embodiment.

FIG. 23 is a flowchart illustrating an example operation for reading the handwritten document sheet SH4 according to the fourth exemplary embodiment. Processing in steps S23-1 to S23-7 is similar to the processing in steps S6-1 to S6-7 illustrated in FIG. 6 described in the first exemplary embodiment, thus their descriptions are not repeated.

In step S23-8, the CPU 2-403 reads image data of a combination target image from the storage medium 2-303. Then, the CPU 2-403 analyzes the read image data and stores IP_MIN (i.e., a minimum value in RGB values of all pixels used in the combination target image) in the RAM 2-402. In this case, the pixel of a pale printed image generated based on IP_MIN has the lowest luminance value in the pale printed image.

In the above-described second exemplary embodiment, the control unit has obtained the thresholds SAT_MAX and LUM_MIN referring to the lowest luminance value I_MIN in the pale printed image. In the present exemplary embodiment, the control unit calculates the threshold based on IP_MIN. Processing in steps S23-9 to S23-11 is similar to the processing in steps S6-8 to S6-10 illustrated in FIG. 6 described in the first exemplary embodiment, thus their descriptions are not repeated.

With the above-described configuration, the control unit scans a combination target image and reflects its luminance value information to the determination. Therefore, the control unit can accurately extract a handwritten image from the handwriting area 3-4 where a pale printed image is located. The control unit can combine the extracted handwritten image with the combination target image. The fourth exemplary embodiment has been described based on the first exemplary embodiment. However, the fourth exemplary embodiment can be combined with the second or third exemplary embodiment to generate the thresholds SAT_MAX and LUM_MIN. For example, if the fourth exemplary embodiment is combined with the third exemplary embodiment, a user can designate a sheet type.

A fifth exemplary embodiment is similar to the first exemplary embodiment except for the method for discriminating a pale printed image from other images.

In the first exemplary embodiment, the control unit executes processing for discriminating the pale printed image based on color distribution information in the following manner. First, the control unit obtains a color-difference of a target pixel in an RGB color space. If the color-difference value of the target pixel is small, the control unit determines that the target pixel belongs to the pale printed image. If the color-difference value is large, the control unit determines that the target pixel does not belong to the pale printed image.

In the first exemplary embodiment, the control unit uses the discrimination method applicable to the RGB color space. However, the determination method can be similarly used in another color space. In the fifth exemplary embodiment, the control unit can convert the image data in the handwriting area 3-4 into data in the Lab color specification system. In this case, the control unit can discriminate the pale printed image from other image based on difference in the distribution.

Figure 24:
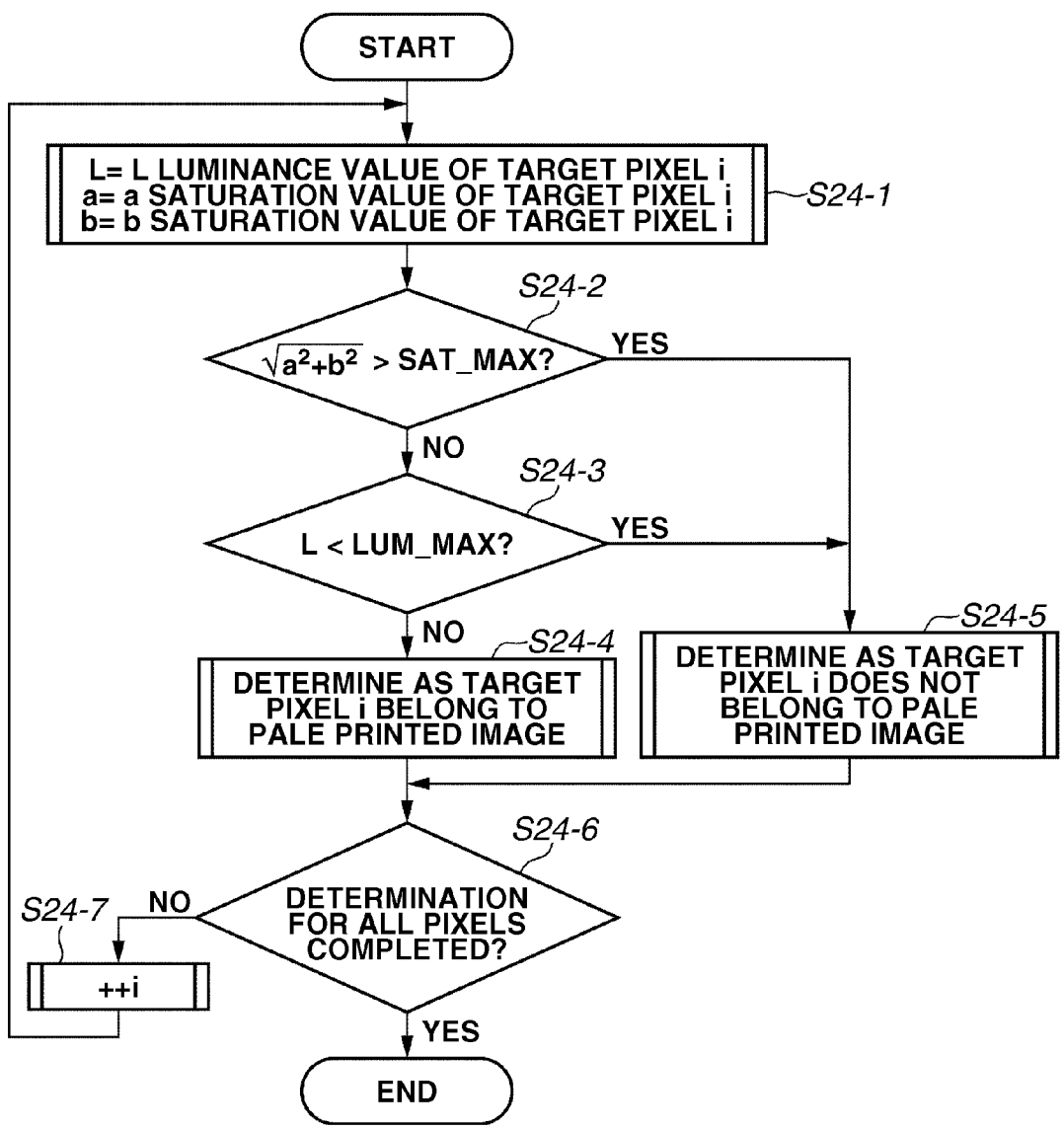
FIG. 24 is a flowchart illustrating an example operation for determining whether a target pixel of image data in a handwriting area belongs to a pale printed image or does not belong to the pale printed image.

FIG. 24 is a flowchart illustrating an example operation for determining whether a target pixel of image data in the handwriting area 3-4 belongs to the pale printed image or other image.

In step S24-1, the CPU 2-403 obtains Lab values (i.e., values in the Lab color specification system) of the target pixel in the handwriting area 3-4. In step S24-2, the CPU 2-403 obtains a saturation value of the target pixel and determines whether the saturation value is greater than a predetermined value. In the Lab color specification system, if the absolute value of lightness (L) is large, the color of the target pixel is close to white. If the absolute value of saturations "a" and "b" are large, the color of the target pixel has a large saturation value (i.e., the color-difference in the present invention).

As understood from FIG. 5, the pale printed image has a small saturation value. Therefore, the CPU 2-403 calculates an absolute value $\sqrt{(a^2+b^2)}$ and determines whether the calculated value $\sqrt{(a^2+b^2)}$ is greater than the predetermined value SAT_MAX. If the value is greater than SAT_MAX (YES in step S24-2), then in step S24-5, the CPU 2-403 determines that the target pixel does not belong to the pale printed image. If the value is equal to or less than SAT_MAX (NO in step S24-2), the processing proceeds to step S24-3. In step S24-3, the CPU 2-403 determines whether the luminance value (L) is less than a predetermined value LUM_MAX.

If it is determined that the luminance value L is less than LUM_MAX (YES in step S24-3), then in step S24-5, the CPU 2-403 determines that the target pixel does not belong to the pale printed image. If it is determined that the luminance value L is equal to or greater than LUM_MAX (NO in step S24-3), then in step S24-4, the CPU 2-403 determines that the target pixel belongs to the pale printed image.

Processing in steps S24-4 to S24-6 is similar to the processing in steps S7-4 to S7-6 illustrated in FIG. 7 described in the first exemplary embodiment, thus their descriptions are not repeated.

As described above, the control unit can discriminate the pale printed image from other image using the similar approach even when the color specification system is not present in the RGB color space.

Although the fifth exemplary embodiment has been described in comparison with the first exemplary embodiment, the fifth exemplary embodiment can be combined with the second, the third, or the fourth exemplary embodiment.

In the above-described exemplary embodiments, an example storage medium which stores the combination target image is an external storage medium. However, the apparatus can read an image from its built-in storage medium if it is provided to store the image. The control unit can not only cause the printer unit to output the combined image as described above but also can transmit the combined image to an external device connected to the apparatus or can cause the display unit to display the combined image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-206200 filed Aug. 8, 2008, which is hereby incorporated by reference herein in its entirety.

What is claimed is:

1. An image processing apparatus, comprising:
a print control unit configured to cause a printing apparatus to print, on a sheet, an image stored in a memory so that the image is printed on the sheet with a density lower than a predetermined density value;
an acquiring unit configured to acquire a read image obtained by reading, by a reading apparatus, the sheet on which the image is printed by the print control unit and information is added by a user;
a specifying unit configured to specify an area, in the read image acquired by the acquiring unit, that corresponds to a difference of a plurality of color components greater than a predetermined threshold, as an information area corresponding to the information added to the sheet by the user; and
a combining unit configured to combine an image of the information area specified in the read image by the specifying unit and the image stored in the memory.

2. The image processing apparatus according to claim 1, wherein the specifying unit specifies the predetermined threshold based on the read image, and specifies the information area based on the specified threshold.

3. The image processing apparatus according to claim 2, wherein the specifying unit specifies the predetermined threshold based on an image corresponding to an area in the image of the sheet read by the reading unit where the print of the sheet is not present.

4. The image processing apparatus according to claim 1, wherein the specifying unit specifies the predetermined threshold based on the image which is printed by the print control unit, and specifies the information area based on the specified threshold.

5. The image processing apparatus according to claim 4, wherein the specifying unit specifies the predetermined threshold based on the image stored in the memory.

6. The image processing apparatus according to claim 1, wherein
the specifying unit specifies the predetermined threshold based on a sheet type of the sheet designated by the user and specifies the information area based on the specified threshold.

7. The image processing apparatus according to claim 1, wherein the plurality of color components are RGB values.

8. The image processing apparatus according to claim 1, further comprising:
an attachment unit configured to attach an external storage medium;
wherein the memory is the external storage medium attached to the attachment unit.

9. The image processing apparatus according to claim 1, further comprising:
a second print control unit configured to cause the printing apparatus to print an image obtained by the combining unit combining the image of the information area specified in the read image and the image stored in the memory.

10. The image processing apparatus according to claim 1, wherein the specifying unit specifies the printed image which is printed by the print control unit and is included in the read image, and specifies the information area in the specified printed image.

11. The image processing apparatus according to claim 1, wherein the specifying unit further specifies in the read image an area in which a luminance value is lower than a predetermined luminance value, as the information area.

12. The image processing apparatus according to claim 11, wherein the luminance value is an average of a plurality of color components of an area in the read image.

13. A method for controlling an image processing apparatus comprising:
controlling a printing apparatus to print, on a sheet, an image stored in a memory so that the image is printed on the sheet with a density lower than a predetermined density value;
acquiring a read image obtained by reading the sheet on which the printed image is printed and information is added;
specifying an area that corresponds to a difference of a plurality of color components greater than a predetermined threshold, as an information area corresponding to the information added to the sheet; and
combining an image of the information area specified in the read image and the image stored in the memory.

14. The method according to claim 13, further comprising specifying the predetermined threshold based on the read image, and specifying the information area based on the specified threshold.

15. The method according to claim 14, further comprising specifying the predetermined threshold based on an image corresponding to an area in the image of the sheet read where the print of the sheet is not present.

16. The method according to claim 13, further comprising specifying the printed image which is printed and is included in the read image, and specifying the information area in the specified printed image.

17. The method according to claim 13, further comprising specifying in the read image an area in which a luminance value is lower than a predetermined luminance value, as the information area.

18. The method according to claim 17, wherein the luminance value is an average of a plurality of color components of an area in the read image.

19. One or more non-transitory computer-readable media comprising instructions that, when executed by one or more computers, cause the computers to perform operations comprising:
controlling printing, on a sheet, of an image stored in a memory so that the image is printed on the sheet with a density lower than a predetermined density value;
acquiring a read image by reading the sheet on which the image is printed and information is added;
specifying an area that corresponds to a difference of a plurality of color components greater than a predetermined threshold, as an information area corresponding to the information added to the sheet; and
combining an image of the information area specified in the read image and the image stored in the memory.

* * * * *